US012613477B2

(12) United States Patent
Yamaguchi et al.

(10) Patent No.: US 12,613,477 B2
(45) Date of Patent: Apr. 28, 2026

(54) TONER, DEVELOPER, TONER STORAGE UNIT, IMAGE FORMING APPARATUS, AND IMAGE FORMING METHOD

(71) Applicants: Ryohei Yamaguchi, Shizuoka (JP); Ryuuta Yoshida, Kanagawa (JP); Yoshiyasu Adachi, Kanagawa (JP); Kazumasa Tabata, Shizuoka (JP); Akira Tanaka, Shizuoka (JP)

(72) Inventors: Ryohei Yamaguchi, Shizuoka (JP); Ryuuta Yoshida, Kanagawa (JP); Yoshiyasu Adachi, Kanagawa (JP); Kazumasa Tabata, Shizuoka (JP); Akira Tanaka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 973 days.

(21) Appl. No.: 17/659,576

(22) Filed: Apr. 18, 2022

(65) Prior Publication Data

US 2022/0342330 A1 Oct. 27, 2022

(30) Foreign Application Priority Data

Apr. 21, 2021 (JP) ................................ 2021-071926
Feb. 18, 2022 (JP) ................................ 2022-023676

(51) Int. Cl.
*G03G 9/087* (2006.01)
*G03G 15/08* (2006.01)

(52) U.S. Cl.
CPC ......... *G03G 9/08755* (2013.01); *G03G 15/08* (2013.01)

(58) Field of Classification Search
CPC .......................... G03G 9/08755; G03G 15/08
See application file for complete search history.

(56) References Cited

U.S. PATENT DOCUMENTS

2013/0252158 A1* 9/2013 Yamada ............ G03G 9/09708 430/105
2013/0316280 A1 11/2013 Yoshida et al.
(Continued)

FOREIGN PATENT DOCUMENTS

JP 2579150 11/1996
JP 11-133665 5/1999
(Continued)

OTHER PUBLICATIONS

U.S. Appl. No. 17/517,359, filed Nov. 2, 2021.
Office Action issued in Japanese Patent Application No. 2022-023676 on Aug. 26, 2025, 2 pages.

*Primary Examiner* — Mark F. Huff
*Assistant Examiner* — Charles Collins Sullivan, IV
(74) *Attorney, Agent, or Firm* — Grüneberg Global IP, PLLC

(57) ABSTRACT

A toner includes toner base particles. Each of the toner base particles includes a binder resin, a colorant, and inorganic filler. An atomic concentration % of Al in the toner base particles as measured by XRF is 0.35 or greater but 0.85 or less. The toner satisfies 0.8<(M1/M2)/(M3/M4)<1.2. M1 is an atomic concentration % of Al in the toner base particles as measured by XPS, M2 is the atomic concentration % of Al in the toner base particles as measured by XRF, and M3 is an atomic concentration % of Al in particles as measured by XPS, and M4 is an atomic concentration % of Al in the particles as measured by XRF. The particles are particles obtained by classifying the toner base particles into 6/5 Dv, and Dv is a volume average particle diameter of the toner base particles.

19 Claims, 4 Drawing Sheets

(56) References Cited

U.S. PATENT DOCUMENTS

| | | | | |
|---|---|---|---|---|
| 2020/0089140 | A1* | 3/2020 | Masuda | G03G 9/0918 |
| 2021/0389686 | A1 | 12/2021 | Kakinuma et al. | |

FOREIGN PATENT DOCUMENTS

| | | | |
|---|---|---|---|
| JP | 2001-158819 | | 6/2001 |
| JP | 2002-287400 | | 10/2002 |
| JP | 2002-351143 | | 12/2002 |
| JP | 2004-046095 | | 2/2004 |
| JP | 2007-271789 | | 10/2007 |
| JP | 2017-156698 | A | 9/2017 |
| JP | 2017-167370 | | 9/2017 |

* cited by examiner

TONER, DEVELOPER, TONER STORAGE UNIT, IMAGE FORMING APPARATUS, AND IMAGE FORMING METHOD

CROSS-REFERENCE TO RELATED APPLICATIONS

The present application claims priority under 35 U.S.C. § 119 to Japanese Patent Application No. 2021-071926, filed Apr. 21, 2021, and Japanese Patent Application No. 2022-023676, filed Feb. 18, 2022. The contents of which are incorporated herein by reference in their entirety.

BACKGROUND OF THE INVENTION

Field of the Invention

The present disclosure relates to a toner, a developer, a toner storage unit, an image forming apparatus, and an image forming method.

Description of the Related Art

Conventionally, an image forming apparatus of an electrophotographic system or latent electrostatic recording system visualizes an electric latent image or magnetic latent image with a toner to perform image formation. According to an electrophotographic method, for example, an electrostatic latent image is formed on a photoconductor, followed by developing the electrostatic latent image with a toner to form a toner image. After transferring the toner image onto a recording medium, such as paper, the toner image is heated and melted to be fixed on the recording medium.

In recent years, there have been demands that a toner has a small particle size and hot offset resistance for improving a quality of output images, low-temperature fixability for energy saving, and heat resistant storage stability for resisting high temperature and high humidity conditions exposed during storage or transportation after the production. Particularly, an improvement in low-temperature fixability of a toner is very important because the energy consumption during fixing constitutes the majority of the energy consumption in the image formation process.

Toners produced by a kneading pulverization method have been used in the art. However, it is difficult to reduce a particle size of a toner produced according to a kneading pulverization method, particle shapes thereof are uneven, and a particle size distribution thereof is broad. Moreover, a fixing temperature for such a toner tends to be a high temperature and therefore there has been a problem in terms of energy saving. Furthermore, bulks are cracked at an interface with a release agent (wax) therein during pulverization according to the kneading pulverization method, and therefore a large amount of the release agent (wax) is present on a surface of a resultant toner particle. While a release effect is exhibited during fixing, toner deposition (filming) on a carrier, a photoconductor, or a blade tends to occur. Therefore, characteristics of the toner are not satisfactory considering the entire process of image formation.

In order to overcome the problems associated with the kneading pulverization method, a production method of a toner according to a polymerization method has been proposed. According to the polymerization method, a toner having a small particle size can be easily produced, a particle size distribution thereof is sharp compared to the particle size distribution of a toner produced by a pulverization method, and wax can be encapsulated inside a resultant toner particle. Shapes of particles of the toner produced by the polymerization method are spherical compared with shapes of pulverized toner particles. Therefore, cleaning performance is impaired due to the spherical shapes of the toner particles, which causes a problem. Moreover, further improvement in low-temperature fixability is desired to meet the current demand for energy saving. Accordingly, it has been desired to maintain heat resistant storage stability and hot offset resistance of the toner, at the same time as improving low-temperature fixability of the toner.

Moreover, a small particle-size toner has been proposed for the purpose of providing a toner having excellent low-temperature fixability (see, for example, Japanese Unexamined Patent Application Publication Nos. 11-133665, 2002-287400, and 2002-351143, Japanese Patent No. 2579150, and Japanese Unexamined Patent Application Publication Nos. 2001-158819, 2004-46095, 2007-271789, and 2017-167370).

SUMMARY OF THE INVENTION

According to an aspect (1) of the present disclosure, a toner includes toner base particles. Each of the toner base particles includes a binder resin, a colorant, and inorganic filler. An atomic concentration % of Al in the toner base particles as measured by X-ray fluorescence spectroscopy (XRF) is 0.35 or greater but 0.85 or less. The toner satisfies $0.8<(M1/M2)/(M3/M4)<1.2$. M1 is an atomic concentration % of Al in the toner base particles as measured by X-ray photoelectron spectroscopy (XPS), M2 is the atomic concentration % of Al in the toner base particles as measured by XRF. M3 is an atomic concentration % of Al in particles as measured by XPS. M4 is the atomic concentration % of Al in the particles as measured by XRF. The particles are particles obtained by classifying the toner base particles into 6/5 Dv, and Dv is a volume average particle diameter of the toner base particles.

DESCRIPTION OF THE EMBODIMENTS

Figure 1:
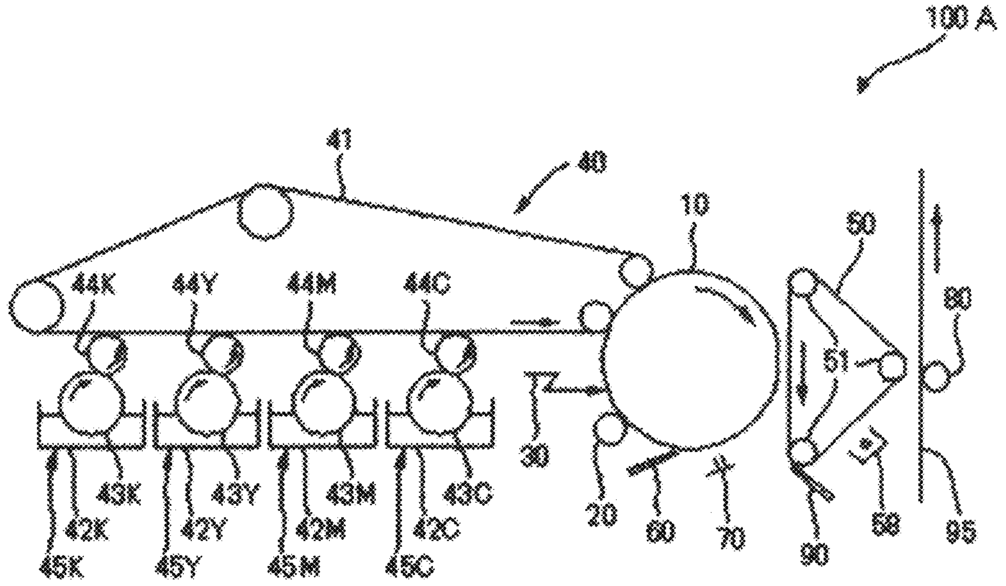
FIG. 1 is a schematic view illustrating an example of an image forming apparatus of the present disclosure.

The embodiments of the present disclosure will be described in detail hereinafter.

(Toner)

The toner of the present disclosure includes toner base particles. Each of the toner base particles includes a binder resin, a colorant, and inorganic filler. An atomic concentration % of Al in the toner base particles as measured by X-ray fluorescence spectroscopy (XRF) is 0.35 or greater but 0.85 or less. The toner satisfies $0.8<(M1/M2)/(M3/M4)<1.2$. M1 is an atomic concentration % of Al in the toner base particles as measured by X-ray photoelectron spectroscopy (XPS), M2 is the atomic concentration % of Al in the toner base particles as measured by XRF, and M3 is an atomic concentration % of Al in particles as measured by XPS, and M4 is the atomic concentration % of Al in the particles as measured by XRF. The particles are particles obtained by classifying the toner base particles into 6/5 Dv, and Dv is a volume average particle diameter of the toner base particles.

The toners described in the related art do not meet the high level of low-temperature fixability desired in the current market.

The present disclosure has an object to provide a toner that has excellent low-temperature fixability and cleaning performance, but does not cause toner scattering.

The present disclosure can provide a toner that has excellent low-temperature fixability and cleaning performance, but does not cause toner scattering.

In the present disclosure, the atomic concentration % in the toner as measured by X-ray fluorescence spectroscopy (XRF) is an index for an amount of Al in the toner bulks (i.e., the toner base particle), and the atomic concentration % in the toner as measured by X-ray photoelectron spectroscopy (XPS) is an index for an Al concentration at a surface of the toner base particle.

The patent literatures of related art disclose a toner having excellent low-temperature fixability, cleaning performance, and transfer efficiency with leaving only a small amount of a residual toner after transferring, but the toner disclosed does not sufficiently satisfy the current demand for energy saving. Therefore, further improvement in low-temperature fixability has been desired.

A toner to which an inorganic material has been added improves chargeability and has desirable shape controllability. Therefore, such a toner is advantageous in view of transferring and cleaning, but the toner has impaired low-temperature fixability because the inorganic material has a high melting point. When the toner and a carrier are mixed in the step prior to transferring, moreover, uneven distribution of the inorganic material within the toner base particles can cause unevenness in charging as a result of mixing the existing toner with a newly supplied toner, and the uneven charge of the toner causes toner scattering.

The present inventors have diligently studied on a toner to which an inorganic material is added, and has found that uniform dispersion of a certain metal element present near a surface of each toner base particle, and an improvement on stress resistance of a toner owing to increased hardness of toner base particles are effective for preventing toner scattering. Moreover, uneven charge can be prevented with the minimum amount of a metal element as long as the metal element added can be appropriately disposed at a surface of each toner base particle. Therefore, the present inventors have found that a toner having desirable cleaning performance and preventing scattering as well as improved low-temperature fixability can be produced.

The toner of the present disclosure having the above-described structure has excellent low-temperature fixability and cleaning performance, and can prevent toner scattering.

According to the present disclosure, an amount of aluminium (Al) in a toner is maintained within a certain range, and an amount of the aluminium (Al) locally present at a surface of each toner base particle is optimized according to a particle size distribution. Specifically, when the amount of Al in the toner is set to the certain range, and the toner satisfies the relationship represented by $0.8<(M1/M2)/(M3/M4)<1.2$, high uniformity is obtained between toner base particles, surfaces of the toner base particles are homogenized, and the arrangement of the inorganic material at the outermost surface of each toner base particle is optimized to the closest to an ideal state, and as a result toner scattering can be prevented. In the formula above, M1 is an atomic concentration % of Al in the toner as measured by X-ray photoelectron spectroscopy (XPS), M2 is an atomic concentration % of Al in the toner as measured by XRF, M3 is an atomic concentration % of Al in particles as measured by XPS, and M4 is an atomic concentration % of Al in the particles as measured by XRF. The particles are particles obtained by classifying the toner into 6/5 Dv, and Dv is the volume average particle diameter of the toner.

Since the arrangement of the inorganic material is optimized, an effect of improving cleaning can be obtained with the minimum amount of the inorganic material. Since more than a necessary amount of the inorganic material is not added, low-temperature fixability can be improved. Even when the toner to which aluminium (Al) is added has a certain range of the particle size distribution, therefore, the toner has an excellent charge amount distribution as a whole, and can achieve both excellent cleaning performance and low-temperature fixability.

The detail thereof will be described hereinafter.

When uniformity between toner base particles are insufficient, an inorganic material tends to be unevenly distributed and an amount of the inorganic material, which is more than necessary, needs to be added to obtain an effect of the inorganic material. Therefore, a resultant toner may not have desirable low-temperature fixability. In addition, the charge amount between the toner base particles may vary, and therefore the distribution of the charge amount is broad, when the toner and a carrier are mixed. As a result, toner scattering may occur. The large particles, that can be obtained by classifying the toner base particles into 6/5 Dv, tend to cause the variation in the charge amount, which may adversely affect image formation.

However, particles of a toner having an excessively small amount of an inorganic material have spherical shapes, and therefore cleaning performance may be impaired. Moreover, sufficient chargeability cannot be secured, and image formation may be adversely affected. In the present disclosure, therefore, the atomic concentration % in the toner as measured by X-ray fluorescence spectroscopy (XRF) is 0.35 or greater but 0.85 or less, preferably 0.4 or greater but 0.8 or less, and more preferably 0.4 or greater but 0.6 or less.

When the atomic concentration % of Al in the toner as measured by the X-ray fluorescence spectroscopy (XRF) is less than 0.35, the particle shape of the toner is close to a true sphere, and therefore cleaning performance is adversely affected, and the charge amount is adversely affected. When the atomic concentration % in the toner as measured by X-ray fluorescence spectroscopy (XRF) is greater than 0.85, low-temperature fixability of the toner is impaired.

In the present disclosure, therefore, a toner having a desirable charge amount distribution, preventing toner scattering, and having very desirable low-temperature fixability can be produced when the toner satisfies the relationship represented by $0.8<(M1/M2)/(M3/M4)<1.2$. M1 is an atomic concentration % of Al in the toner as measured by X-ray photoelectron spectroscopy (XPS), M2 is an atomic concentration % of Al in the toner as measured by XRF, M3 is an atomic concentration % of Al in particles as measured by XPS, and M4 is an atomic concentration % of Al in the particles as measured by XRF. The particles are particles obtained by classifying the toner into 6/5 Dv, and Dv is the volume average particle diameter of the toner.

The ratio $(M1/M2)/(M3/M4)$ is a ratio of the composition of the surface region to the composition of the bulk between the toner base particles having different particle diameters.

In the present disclosure, moreover, the ratio $(M1/M2)/(M3/M4)$ preferably satisfies $0.9<(M1/M2)/(M3/M4)<1.1$ for further improving the effects of the present disclosure.

In the present disclosure, furthermore, (M1/M2) is preferably greater than 1.4, and (M1/M2) is more preferably greater than 1.4 but 2.1 or less, because chargeability improves and toner scattering is not easily caused when a large amount of an Al element is present at a surface of each toner base particle.

<X-Ray Fluorescence Spectroscopy (XRF)>

For example, the amount of aluminium (Al) in the toner can be measured by X-ray fluorescence spectroscopy (XRF) in the following manner. A calibration curve is prepared in advance by producing a toner, in which a certain amount of a layered inorganic mineral is added as inorganic filler. A method for preparing a sample is as described below.

The toner sample (3.75 g) is dispersed in 50 mL of a 0.5% by mass polyoxyalkylene alkyl ether dispersion liquid accommodated in a 110 mL vial. Ultrasonic waves are applied to the toner dispersion liquid for a certain period by means of an ultrasonic homogenizer (product name: homogenizer, type: VCX750, CV33, available from Sonics & Materials, Inc.) The ultrasonic wave dispersion is performed for 100 seconds at a frequency of 20 Hz and output of 40 W. The applied energy amount can be calculated from a product of the output by the duration of the application. Moreover, the ultrasonic wave dispersion is performed with appropriately cooling the toner dispersion liquid so that the liquid temperature of the toner dispersion liquid does not reach 40° C. or higher. The obtained dispersion liquid is subjected to vacuum filtration with filter paper (product name: Quantitative filter paper (No. 2, 110 mm), available from Advantec Toyo Kaisha, Ltd.). The resultant is washed twice with ion-exchanged water, and then is subjected to filtration. After removing the free inorganic particles, the toner base particles are dried. After the drying, the obtained toner (3 g) is formed into a pellet having a diameter of 3 mm and a thickness of 2 mm by means of an automatic briquetting press (T-BRB-32, available from Maekawa Testing Machine MFG. Co., Ltd.) for the press duration of 60 sec (manufacturer's condition) at a load of 6.0 t, and the amount of aluminium (Al) in the toner is measured through a quantitative analysis by means of an X-ray fluorescence spectrometer (ZSX-100e, available from Rigaku Corporation).

Hereinafter, a case where the layered inorganic mineral is used as inorganic filler will be described as a representative example, but the present disclosure is not limited to the following embodiment.

<X-Ray Photoelectron Spectroscopy (XPS)>

For example, the amount of aluminium (Al) present near a surface of each toner base particle can be measured by X-ray photoelectron spectroscopy (XPS) in the following manner. XPS can typically detect the atomic concentration in the region extending to about several tens nanometers in depth from a surface of a particle.

Used device: 1600S X-ray photoelectron spectrometer, available from ULVAC-PHI, INCORPORATED.

Usage conditions: X-ray source MgKα (100 W)

Analyzing region: 0.8 mm×2.0 mm

As a sample, the toner is placed on a carbon sheet on a sample holder, and then the toner is subjected to a measurement. The toner used for the measurement is processed in advance in the following manner.

The toner sample (3.75 g) is dispersed in 50 mL of a 0.5% by mass polyoxyalkylene alkyl ether dispersion liquid accommodated in a 110 mL vial. Ultrasonic waves are applied to the toner dispersion liquid for a certain period by means of an ultrasonic homogenizer (product name: homogenizer, type: VCX750, CV33, available from Sonics & Materials, Inc.) The ultrasonic wave dispersion is performed for 100 seconds at a frequency of 20 Hz and output of 40 W. The applied energy amount can be calculated from a product of the output by the duration of application. Moreover, the ultrasonic wave dispersion is performed with appropriately cooling the toner dispersion liquid so that the liquid temperature of the toner dispersion liquid does not reach 40° C. or higher. The obtained dispersion liquid is subjected to vacuum filtration with filter paper (product name: Quantitative filter paper (No. 2, 110 mm), available from Advantec Toyo Kaisha, Ltd.). The resultant is washed twice with ion-exchanged water, and then is subjected to filtration. After removing the free inorganic particles, the toner base particles are dried.

The surface atomic concentration is calculated and estimated from the peak intensity of each atomic concentration measured using the relative sensitivity factor provided by ULVAC-PHI, INCORPORATED. In the measurement above, aluminium (Al) is included in the layered inorganic mineral. Therefore, the atomic concentration % of Al can be estimated from the detected elements.

<Volume Average Particle Diameter (Dv)>

The volume average particle diameter (Dv) is measured by means of a particle size analyzer (Multisizer III, available from Beckman Coulter, Inc.) with an aperture diameter of 100 μm, and is analyzed by analysis software (Beckman Coulter Multisizer 3 Version 3.51). Specifically, a 100 mL glass beaker is charged with 0.5 mL of a 10% by mass surfactant (alkyl benzene sulfonate, NEOGEN SC-A, available from DKS Co., Ltd.), and 0.5 g of the toner, and the resultant mixture is stirred with a micro spatula. To the resultant, 80 mL of ion-exchanged water is added. The obtained dispersion liquid is dispersed for 10 minutes by means of an ultrasonic disperser (W-113MK-II, available from HONDA ELECTRONICS Co., Ltd.). The dispersion liquid is measured by means of Multisizer III with using ISOTON III (available from Beckman Coulter, Inc.) as a solution for the measurement. The particles obtained by classifying the toner into 6/5 Dv can be obtained according to any of known methods.

In order to produce the toner satisfying the above-described relationship, the following adjustment method may be used.

A binder resin, a colorant, a layered inorganic mineral, and optionally a release agent are dispersed in an organic solvent. During the dispersing, the better dispersibility is preferably because the better dispersibility can cause less uneven distribution of the materials, and homogeneity of a resultant toner is improved. To the dispersion liquid, a crosslinking agent or elongation agent including tertiary amine is added, to thereby obtain an oily dispersion liquid. The oily dispersion liquid is dispersed in an aqueous medium including resin particles to obtain an emulsified dispersion liquid. The organic solvent is removed from the emulsified dispersion liquid, to thereby obtain a toner.

An amount of Al present at a surface of each toner base particle can be adjusted by appropriately performing a process of dispersing in the production process of the oily dispersion liquid. Weak dispersing cannot achieve sufficient dispersion of the layered inorganic mineral. As a result, the layered inorganic mineral is unevenly present as bulks in each toner base particle, leading to uneven chargeability. Moreover, a large amount of the layered inorganic mineral needs to be added to achieve sufficient chargeability of a toner as a whole, and therefore low-temperature fixability is impaired.

When a dispersing force is too strong, such as the extent to which primary particles are crushed, the raw materials are dispersed more than necessary, resulting in an overdispersed state. In the overdispersed state, chemical activity of interfaces of raw material particles is high, and therefore a viscosity may be significantly increased, or the layered inorganic mineral may be reaggregated. As a result, a quality of an image formed with the toner is adversely affected, such as formation of an uneven or rough image, by a significant increase in a charge amount, or irregular shapes of the toner base particles.

The amount of aluminium (Al) present at a surface of each toner base particle can be adjusted by adjusting an amount of energy applied when dispersing is performed on the oily dispersion liquid in a production method of a toner. The production method of the toner of the present disclosure will be described in detail hereinafter.

Next, a binder resin, a release agent, a colorant, etc. included in the toner base particles of the present embodiment will be described.

The toner of the present embodiment may further include external additives, as well as the toner base particles.

<Binder Resin>

The binder resin preferably includes a polyester resin. Examples of the polyester resin include a crystalline polyester resin and an amorphous polyester resin.

<Crystalline Polyester Resin>

The crystalline polyester resin (may be referred to as a "crystalline polyester resin C" hereinafter) has high crystallinity, and therefore the crystalline polyester resin has heat fusion characteristics that viscosity thereof drastically changes at a temperature around a fixing onset temperature.

By using the crystalline polyester resin C having the above-described characteristics in combination with an amorphous polyester resin, a toner having both excellent heat resistant storage stability and low-temperature fixability can be obtained. By using the crystalline polyester resin C and the amorphous polyester resin in combination, for example, excellent heat resistant storage stability can be secured up to at a temperature just below the melt onset temperature owing to crystallinity of the crystalline polyester resin C, and drastic reduction in viscosity (sharp melting) is caused at the melt onset temperature owing to melting of the crystalline polyester resin C. As a result of sharp melting, the crystalline polyester resin C becomes compatible with the below-described amorphous polyester resin B, and the viscosity is drastically reduced. Therefore, excellent fixing can be performed.

Moreover, an excellent release width (a difference between the minimum fixing temperature and hot offset onset temperature) can be also achieved.

The crystalline polyester resin C is obtained from polyvalent alcohol, and polyvalent carboxylic acid (e.g., polyvalent carboxylic acid, polyvalent carboxylic acid anhydride, and polyvalent carboxylic acid ester) or a derivative thereof.

In the present disclosure, as described above, the crystalline polyester resin C is a crystalline polyester resin obtained using polyvalent alcohol, and polyvalent carboxylic acid (e.g., polyvalent carboxylic acid, polyvalent carboxylic acid anhydride, and polyvalent carboxylic acid ester) or a derivative thereof. A modified polyester resin, such as a below-described prepolymer and a resin obtained through a cross-link reaction and/or an elongation reaction of the prepolymer, is not classified as the crystalline polyester resin C.

—Polyvalent Alcohol—

The polyvalent alcohol is not particularly limited, and may be appropriately selected depending on the intended purpose. Examples thereof include diol, and trivalent or higher alcohol.

Examples of the diol include saturated aliphatic diol. Examples of the saturated aliphatic diol include straight-chain saturated aliphatic diol, and branched saturated aliphatic diol. Among the above-listed examples, straight-chain saturated aliphatic diol is preferable, and C2-C12 straight-chain saturated aliphatic diol is more preferable. When the saturated aliphatic diol has a branched structure, the crystalline polyester resin C may have low crystallinity, and the low crystallinity leads to a melting point. When the number of carbon atoms in the saturated aliphatic diol is greater than 12, moreover, it may be difficult to source materials for use. The number of carbon atoms is preferably 12 or less.

Examples of saturated aliphatic diol include ethylene glycol, 1,3-propanediol, 1,4-butanediol, 1,5-pentadiol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Among the above-listed examples, ethylene glycol, 1,4-butanediol, 1,6-hexanediol, 1,8-octanediol, 1,10-decanediol, and 1,12-dodecanediol are preferable because a resultant crystalline polyester resin C has high crystallinity and excellent sharp melting properties.

Examples of the trivalent or higher alcohol include glycerin, trimethylol ethane, trimethylol propane, and pentaerythritol.

The above-listed examples may be used alone or in combination.

—Polyvalent Carboxylic Acid—

The polyvalent carboxylic acid is not particularly limited, and may be appropriately selected depending on the intended purpose. Examples thereof include divalent carboxylic acid, and trivalent or higher carboxylic acid.

Examples of the divalent carboxylic acid include: saturated aliphatic dicarboxylic acid, such as oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid; aromatic dicarboxylic acid, such as dibasic acid (e.g., phthalic acid, isophthalic acid, terephthalic acid, and naphthalene-2,6-dicarboxylic acid); malonic acid, and mesaconic acid; anhydrides thereof, and lower (C1-C3) alkyl esters thereof.

Examples of the trivalent or higher carboxylic acid include 1,2,4-benzenetricarboxylic acid, 1,2,5-benzenetricarboxylic acid, 1,2,4-naphthalenetricarboxylic acid, anhydrides thereof, and lower (C1-C3) alkyl esters thereof.

As well as the saturated aliphatic dicarboxylic acid or aromatic dicarboxylic acid, moreover, dicarboxylic acid having a sulfonic acid group may be included as the polyvalent carboxylic acid. As well as the saturated aliphatic dicarboxylic acid or aromatic dicarboxylic acid, furthermore, dicarboxylic acid having a double bond may be included.

The above-listed examples may be used alone or in combination.

The crystalline polyester resin C is preferably formed from C4-C12 straight-chain saturated aliphatic dicarboxylic acid and C2-C12 straight-chain saturated aliphatic diol. Specifically, the crystalline polyester resin C preferably includes a constitutional unit derived from C4-C12 saturated aliphatic dicarboxylic acid and a constitutional unit derived from C2-C12 saturated aliphatic diol. Such a crystalline polyester resin C is preferable because excellent sharp melting properties can be imparted to a resultant toner to exhibit excellent low-temperature fixability.

A melting point of the crystalline polyester resin C is not particularly limited, and may be appropriately selected depending on the intended purpose. The melting point thereof is preferably 60° C. or higher but 80° C. or lower. When the melting point of the crystalline polyester resin C is 60° C. or higher, the crystalline polyester resin C does not melt at a low temperature and therefore desirable heat resistant storage stability of a resultant toner can be secured. When the melting point thereof is 80° C. or lower, melting of the crystalline polyester resin C by heat applied during fixing can be improved, and low-temperature fixability can be prevented from being impaired.

A molecular weight of the crystalline polyester resin C is not particularly limited, and may be appropriately selected depending on the intended purpose. Considering that the crystalline polyester resin C having a sharp molecular weight distribution and a low molecular weight imparts excellent low-temperature fixability, and a large amount of the low molecular weight components may degrade heat resistant storage stability, the ortho-dichlorobenzene soluble component of the crystalline polyester resin C as measured by GPC preferably has a weight average molecular weight (Mw) of from 3,000 through 30,000, a number average molecular weight (Mn) of from 1,000 through 10,000, and Mw/Mn of from 1.0 through 10.

Moreover, the weight average molecular weight (Mw) of the crystalline polyester resin C is more preferably from 5,000 through 15,000, the number average molecular weight (Mn) thereof is more preferably from 2,000 through 10,000, and the ratio Mw/Mn is more preferably from 1.0 through 5.0.

An acid value of the crystalline polyester resin C is not particularly limited, and may be appropriately selected depending on the intended purpose. In order to achieve desired low-temperature fixability in view of affinity between paper and the resin, the acid value thereof is preferably 5 mgKOH/g or greater, and more preferably 10 mgKOH/g or greater. In order to improve hot offset resistance, the acid value thereof is preferably 45 mgKOH/g or less.

A hydroxyl value of the crystalline polyester resin C is not particularly limited, and may be appropriately selected depending on the intended purpose. In order to achieve desired low-temperature fixability and excellent charging characteristics, the hydroxyl value thereof is preferably from 0 mgKOH/g through 50 mgKOH/g, and more preferably from 5 mgKOH/g through 50 mgKOH/g.

The molecular structure of the crystalline polyester resin C can be confirmed by solution or solid NMR spectroscopy, X-ray diffraction spectroscopy, GC/MS, LC/MS, or IR spectroscopy. As a simple method for confirming the molecule structure thereof, there is a method for detecting, as the crystalline polyester resin C, a compound having absorption, which is based on SCH (out plane bending) of olefin, at 965±10 $cm^{-1}$ or 990±10 $cm^{-1}$ in an infrared absorption spectrum thereof.

An amount of the crystalline polyester resin C is not particularly limited, and may be appropriately selected depending on the intended purpose. The amount of the crystalline polyester resin C is preferably from 3 parts by mass through 20 parts by mass, and more preferably from 5 parts by mass through 15 parts by mass, relative to 100 parts by mass of the toner. When the amount thereof is 3 parts by mass or greater, sharp-melt properties of a resultant toner can be improved because of the crystalline polyester resin C, and therefore desirable low-temperature fixability is obtained. When the amount thereof is 20 parts by mass or less, excellent heat resistant storage stability is obtained, and therefore a high quality image can be formed with a resultant toner.

<Amorphous Polyester Resin>

The amorphous polyester resin is not particularly limited, and may be appropriately selected depending on the intended purpose. The amorphous polyester resin preferably includes an amorphous polyester resin A and an amorphous polyester resin B, which will be described hereinafter.

—Amorphous Polyester Resin A—

The amorphous polyester resin A is not particularly limited, and may be appropriately selected depending on the intended purpose. The amorphous polyester resin A has a glass transition temperature (Tg) of preferably −60° C. or higher but 20° C. or less, and more preferably −40° C. or higher but 20° C. or lower.

The amorphous polyester resin A is not particularly limited, and may be appropriately selected depending on the intended purpose. The amorphous polyester resin A is preferably obtained through a reaction between a non-linear reactive precursor and a curing agent.

Moreover, the amorphous polyester resin A preferably has a urethane bond, or a urea bond, or both considering excellent adhesion to a recording medium, such as paper. Since the amorphous polyester resin A includes a urethane bond or a urea bond, the urethane bond or the urea bond behaves as a pseudo-crosslinking point to enhance rubber-like characteristics of the amorphous polyester resin A, and therefore heat resistant storage stability and hot offset resistance of a resultant toner improve.

—Non-Linear Reactive Precursor—

The non-linear reactive precursor is not particularly limited as long as the non-linear reactive precursor is a polyester resin having a group reactive with the curing agent (may be referred to as a "prepolymer" hereinafter). The non-linear reactive precursor may be appropriately selected depending on the intended purpose.

Examples of the group included in the prepolymer, which is reactive with the curing agent, include a group reactive with an active hydrogen group. Examples of the group reactive with an active hydrogen group include an isocyanate group, an epoxy group, carboxylic acid, and an acid chloride group. Among the above-listed examples, an isocyanate group is preferable because a urethane bond or a urea bond can be introduced to a resultant amorphous polyester resin A.

The prepolymer is preferably a non-linear prepolymer. The non-linear prepolymer means a prepolymer having a branched structure imparted by at least one selected from the group consisting of trivalent or higher alcohol and trivalent or higher carboxylic acid.

Moreover, the prepolymer is preferably an isocyanate group-containing polyester resin.

—Isocyanate Group-Containing Polyester Resin—

The isocyanate group-containing polyester resin is not particularly limited, and may be appropriately selected depending on the intended purpose. Examples thereof include a reaction product between an active hydrogen group-containing polyester resin and polyisocyanate. For example, the active hydrogen group-containing polyester resin is obtained through polycondensation between diol, dicarboxylic acid, and at least one selected from the group consisting of trivalent or higher alcohol and trivalent or higher carboxylic acid. The trivalent or higher alcohol and the trivalent or higher carboxylic acid impart a branched structure to the isocyanate group-containing polyester resin.

—Diol—

The diol is not particularly limited, and may be appropriately selected depending on the intended purpose. Examples thereof include: aliphatic diol, such as ethylene glycol, 1,2-propylene glycol, 1,3-propylene glycol, 1,4-butanediol, 3-methyl-1,5-pentadiol, 1,6-hexanediol, 1,8-octanediol, 1,10-decanediol, and 1,12-dodecane; oxyalkylene group-containing diol, such as diethylene glycol, triethylene glycol, dipropylene glycol, polyethylene glycol, polypropylene glycol, and polytetrametylene glycol; alicyclic diol, such as 1,4-cyclohexanedimethanol, and hydrogenated bisphenol A; alkylene oxide (e.g., ethylene oxide, propylene oxide, and butylene oxide) of alicyclic diol; bisphenols, such as bisphenol A, bisphenol F, and bisphenol S; and alkylene oxide adducts of bisphenol, such as bisphenols to which alkylene oxide (e.g., ethylene oxide, propylene oxide, and butylene oxide) is added. Among the above-listed examples, C4-C12 aliphatic diol is preferable. The above-listed diols may be used alone or in combination.

—Dicarboxylic Acid—

The dicarboxylic acid is not particularly limited, and may be appropriately selected depending on the intended purpose. Examples thereof include aliphatic dicarboxylic acid, and aromatic dicarboxylic acid. Moreover, anhydrides thereof may be used, lower (C1-C3) alkyl esters thereof may be used, or halogenated products thereof may be used.

The aliphatic dicarboxylic acid is not particularly limited, and may be appropriately selected depending on the intended purpose. Examples thereof include succinic acid, adipic acid, sebacic acid, dodecanedioic acid, maleic acid, and fumaric acid.

The aromatic dicarboxylic acid is not particularly limited, and may be appropriately selected depending on the intended purpose. The aromatic dicarboxylic acid is preferably C8-C20 aromatic dicarboxylic acid. The C8-C20 aromatic dicarboxylic acid is not particularly limited, and may be appropriately selected depending on the intended purpose. Examples thereof include phthalic acid, isophthalic acid, terephthalic acid, and naphthalene dicarboxylic acid.

Among the above-listed examples, C4-C12 aliphatic dicarboxylic acid is preferable.

The above-listed dicarboxylic acids may be used alone or in combination.

—Trivalent or Higher Alcohol—

The trivalent or higher alcohol is not particularly limited, and may be appropriately selected depending on the intended purpose. Examples thereof include trivalent or higher aliphatic alcohol, trivalent or higher polyphenols, and alkylene oxide adducts of trivalent or higher polyphenols.

Examples of the trivalent or higher aliphatic alcohol include glycerin, trimethylol ethane, trimethylol propane, pentaerythritol, and sorbitol.

Examples of the trivalent or higher polyphenols include trisphenol PA, phenolic novolac, and cresol novolac.

Examples of the alkylene oxide adduct of trivalent or higher polyphenols include alkylene oxide (e.g., ethylene oxide, propylene oxide, and butylene oxide) adducts of trivalent or higher polyphenols.

The amorphous polyester resin A preferably includes trivalent or higher aliphatic alcohol as a constitutional component. Since the amorphous polyester resin A includes trivalent or higher aliphatic alcohol as a constitutional component, a molecular skeleton of the amorphous polyester resin A has a branched structure, and the molecular chain thereof has a three-dimensional network structure. Therefore, the amorphous polyester resin A has rubber-like characteristics that the amorphous polyester A deforms but does not flow at a low temperature. Use of the amorphous polyester resin A can achieve both heat resistant storage stability and hot offset resistance of a resultant toner.

The amorphous polyester resin A can use trivalent or higher carboxylic acid or epoxy as a crosslink component therein. When the carboxylic acid is used as the crosslink component, the compound including such a crosslink component is often an aromatic compound, or an ester bond density of the crosslink site is high, and therefore a resultant toner may not achieve sufficient gloss when the toner is fixed with heat and formed into a fixed image. When a crosslinking agent, such as epoxy, is used, a cross-linking reaction is performed after polymerization of polyester. Therefore, it is difficult to control a distance between crosslink points thus target viscoelasticity cannot be obtained. As the epoxy tends to react with oligomers during formation of polyester to form sites having high crosslink density, a fixed image tends to be uneven, leading to impaired glossiness or image density.

—Trivalent or Higher Carboxylic Acid—

The trivalent or higher carboxylic acid is not particularly limited, and may be appropriately selected depending on the intended purpose. Examples thereof include trivalent or higher aromatic carboxylic acid. Moreover, anhydrides thereof may be used, lower (C1-C3) alkyl esters thereof may be used, or halogenated products thereof may be used.

The trivalent or higher aromatic carboxylic acid is preferably C9-C20 trivalent or higher aromatic carboxylic acid. Examples of the C9-C20 trivalent or higher aromatic carboxylic acid include trimellitic acid, and pyromellitic acid.

—Polyisocyanate—

The polyisocyanate is not particularly limited, and may be appropriately selected depending on the intended purpose. Examples thereof include diisocyanate, and trivalent or higher isocyanate.

Examples of the diisocyanate include aliphatic diisocyanate, alicyclic diisocyanate, aromatic diisocyanate, aromatic aliphatic diisocyanate, isocyanurates, and any of the above-listed diisocyanates blocked with a phenol derivative, oxime, or caprolactam.

The aliphatic diisocyanate is not particularly limited, and may be appropriately selected depending on the intended purpose. Examples thereof include tetramethylene diisocyanate, hexamethylene diisocyanate, 2,6-diisocyanatocaproic acid methyl ester, octamethylene diisocyanate, decamethylene diisocyanate, dodecamethylene diisocyanate, tetradecamethylene diisocyanate, trimethylhexanediisocyanate, and tetramethylhexane diisocyanate.

The alicyclic diisocyanate is not particularly limited, and may be appropriately selected depending on the intended purpose. Examples thereof include isophorone diisocyanate, and cyclohexylmethane diisocyanate.

The aromatic diisocyanate is not particularly limited, and may be appropriately selected depending on the intended purpose. Examples thereof include tolylene diisocyanate, diisocyanatodiphenyl methane, 1,5-naphthylenediisocyanate, 4,4'-diisocyanatodiphenyl, 4,4'-disocyanato-3,3'-dimethyldiphenyl, 4,4'-diisocyanato-3-methyldiphenylmethane, and 4,4'-diisocyanato-diphenyl ether.

The aromatic aliphatic diisocyanate is not particularly limited, and may be appropriately selected depending on the intended purpose. Examples thereof include α,α,α',α'-tetramethylxylylenediisocyanate.

The isocyanurate is not particularly limited, and may be appropriately selected depending on the intended purpose. Examples thereof include tris(isocyanatalkyl)isocyanurate, and tris(isocyanatocycloalkylisocyanurate. The above-listed polyisocyanates may be used alone or in combination.

—Curing Agent—

The curing agent is not particularly limited as long as the curing agent is a curing agent capable of reacting with the non-linear reactive precursor to generate the amorphous polyester resin A. The curing agent may be appropriately selected depending on the intended purpose. Examples of the curing agent include an active hydrogen group-containing compound.

—Active Hydrogen Group-Containing Compound—

An active hydrogen group in the active hydrogen group-containing compound is not particularly limited, and may be appropriately selected depending on the intended purpose. Examples of the active hydrogen group include a hydroxyl group (e.g., an alcoholic hydroxyl group, and a phenolic hydroxyl group), an amino group, a carboxyl group, and a mercapto group. The above-listed examples may be used alone or in combination.

The active hydrogen group-containing compound is not particularly limited, and may be appropriately selected depending on the intended purpose. The active hydrogen group-containing compound is preferably amines because a urea bond can be formed.

The amines are not particularly limited, and may be appropriately selected depending on the intended purpose. Examples thereof include diamine, trivalent or higher amine, amino alcohol, aminomercaptan, amino acid, and any of the above-listed amines in which an amino group is blocked. The above-listed examples may be used alone or in combination.

Among the above-listed examples, diamine, and a mixture of diamine and a small amount of trivalent or higher amine are preferable.

The diamine is not particularly limited, and may be appropriately selected depending on the intended purpose. Examples of the diamine include aromatic diamine, alicyclic diamine, and aliphatic diamine. The aromatic diamine is not particularly limited, and may be appropriately selected depending on the intended purpose. Examples thereof include phenylene diamine, diethyltoluene diamine, and 4,4'-diaminodiphenylmethane.

The alicyclic diamine is not particularly limited, and may be appropriately selected depending on the intended purpose. Examples thereof include 4,4'-diamino-3,3'-dimethyldicyclohexylmethane, diaminocyclohexane, and isophorone diamine. The aliphatic diamine is not particularly limited, and may be appropriately selected depending on the intended purpose. Examples thereof include ethylene diamine, tetramethylene diamine, and hexamethylene diamine.

The trivalent or higher amine is not particularly limited, and may be appropriately selected depending on the intended purpose. Examples thereof include diethylene triamine, and triethylene tetramine.

The amino alcohol is not particularly limited, and may be appropriately selected depending on the intended purpose. Examples thereof include ethanolamine, and hydroxyethylaniline.

The aminomercaptan is not particularly limited, and may be appropriately selected depending on the intended purpose. Examples thereof include aminoethyl mercaptan, and aminopropyl mercaptan.

The amino acid is not particularly limited, and may be appropriately selected depending on the intended purpose. Examples thereof include amino propionic acid, and amino caproic acid.

The amine in which an amino group is blocked is not particularly limited, and may be appropriately selected depending on the intended purpose. Examples thereof include ketimine compounds and oxazoline compounds obtained by blocking an amino group with any of ketones, such as acetone, methyl ethyl ketone, and methyl isobutyl ketone.

In order to maintain Tg of the amorphous polyester resin A low to secure deformable characteristics at low temperatures, the amorphous polyester resin A includes a diol component as a constitutional component, and the diol component preferably includes C4-C12 aliphatic diol in the amount of 50% by mass or greater.

Moreover, the amorphous polyester resin A includes 50% by mass or greater of C4-C12 aliphatic diol relative to the entire alcohol component. When the amount of C4-C12 aliphatic diol in the entire alcohol component is 50% by mass or greater, Tg of the amorphous polyester resin A can be kept low, and deformable characteristics at low temperatures may be easily imparted.

The amorphous polyester resin A includes a dicarboxylic acid component as a constitutional unit, and the dicarboxylic acid component preferably includes C4-C12 aliphatic dicarboxylic acid in the amount of 50% by mass or greater. When the amount of the C4-C12 aliphatic dicarboxylic acid is 50% by mass or greater, Tg of the amorphous polyester resin A can be kept low, and deformable characteristics at low temperatures may be easily imparted.

A weight average molecular weight of the amorphous polyester resin A is not particularly limited, and may be appropriately selected depending on the intended purpose. The weight average molecular weight of the amorphous polyester resin A as measured by gel permeation chromatography (GPC) is preferably 10,000 or greater but 1,000,000 or less, more preferably 10,000 or greater but 300,000 or less, and particularly preferably 10,000 or greater but 200,000 or less. When the weight average molecular weight of the amorphous polyester resin A is 10,000 or greater, a resultant toner is prevented from flowing at low temperatures and therefore improved heat resistant storage stability of a resultant toner is achieved. In addition, viscosity of a resultant toner is maintained at an appropriate level during melting to secure sufficient hot offset resistance.

A molecular structure of the amorphous polyester resin A can be confirmed by solution or solid NMR spectroscopy, X-ray diffraction spectroscopy, GC/MS, LC/MS, or IR spectroscopy. As a simple method for confirming the molecular structure thereof, there is a method for detecting, as the amorphous polyester resin, a compound that does not have absorption, which is based on &CH (out plane bending) of olefin, at 965±10 $cm^{-1}$ or 990±10 $cm^{-1}$ in an infrared absorption spectrum thereof.

An amount of the amorphous polyester resin A is not particularly limited, and may be appropriately selected depending on the intended purpose. The amount thereof is preferably from 5 parts by mass through 25 parts by mass, and more preferably from 10 parts by mass through 20 parts by mass, relative to 100 parts by mass of the toner. When the amount thereof is 5 parts by mass or greater, sufficient low-temperature fixability and hot offset resistance can be obtained. When the amount thereof is 25 parts by mass or less, heat resistant storage stability is secured, and desired glossiness of an image is obtained after fixing. The amount within the above-described more preferable range is advantageous because a resultant toner excels in all of low-temperature fixability, hot offset resistance, and heat resistant stability.

—Amorphous Polyester Resin B—

The amorphous polyester resin B is preferably a linear polyester resin. Moreover, the amorphous polyester resin B is preferably an unmodified polyester resin.

The unmodified polyester resin is a polyester resin obtained from polyvalent alcohol and polyvalent carboxylic acid (e.g., polyvalent carboxylic acid, polyvalent carboxylic acid anhydride, and polyvalent carboxylic acid ester) or a derivative thereof. Moreover, the unmodified polyester resin is a polyester resin that is not modified with an isocyanate compound etc.

The amorphous polyester resin B is preferably free from a urethane bond and an urea bond.

The amorphous polyester resin B includes a dicarboxylic acid component as a constitutional component thereof, and the dicarboxylic acid component preferably includes terephthalic acid in the amount of 50 mol % or greater. The dicarboxylic acid component including 50 mol % or greater of terephthalic acid is advantageous considering heat resistant storage stability of a resultant toner.

Examples of the polyvalent alcohol include diol.

Examples of the diol include (C2-C3) alkylene oxide adducts (average number of moles added: from 1 through 10) of bisphenol A (e.g., polyoxypropylene (2.2)-2,2-bis(4-hydroxyphenyl)propane, and polyoxyethylene(2.2)-2,2-bis(4-hydroxyphenyl)propane) ethylene glycol), propylene glycol, hydrogenated bisphenol A, (C2-C3) alkylene oxide adducts (average number of moles added: from 1 through 10) of hydrogenated bisphenol A.

The above-listed examples may be used alone or in combination.

Examples of the polyvalent carboxylic acid include dicarboxylic acid.

Examples of the dicarboxylic acid include adipic acid, phthalic acid, isophthalic acid, terephthalic acid, fumaric acid, maleic acid, and succinic acid substituted with a C1-C20 alkyl group or a C2-C20 alkenyl group (e.g., dodecenylsuccinic acid, and octylsuccinic acid).

The above-listed examples may be used alone or in combination.

For the purpose of adjusting the acid value and the hydroxyl value, moreover, the amorphous polyester resin B may include at least one selected from the group consisting of trivalent or higher carboxylic acid, and trivalent or higher alcohol at a terminal of a molecular chain of the amorphous polyester resin B.

Examples of the trivalent or higher carboxylic acid include trimellitic acid, pyromellitic acid, and acid anhydrides thereof.

Examples of the trivalent or higher alcohol include glycerin, pentaerythritol, and trimethylolpropane.

A molecular weight of the amorphous polyester resin B is not particularly limited, and may be appropriately selected depending on the intended purpose. A weight average molecular weight (Mw) of the amorphous polyester resin B as measured by gel permeation chromatography (GPC) is preferably from 3,000 through 10,000. A number average molecular weight (Mn) thereof is preferably from 1,000 through 4,000. A ratio Mw/Mn is preferably from 1.0 through 4.0.

When the molecular weight of the amorphous polyester resin B is the above-mentioned lower limit or greater, desirable heat resistant storage stability, and desirable durability of a resultant toner against stress (e.g., stress applied by stirring inside a developing device) can be obtained. When the molecular weight of the amorphous polyester resin B is the above-mentioned upper limit or lower, viscoelasticity of a resultant toner during melting is desirable, and thus desirable low-temperature fixability can be obtained.

The weight average molecular weight (Mw) is more preferably from 4,000 through 7,000. The number average molecular weight (Mn) is more preferably from 1,500 through 3.000. The ratio Mw/Mn is more preferably from 1.0 through 3.5.

An acid value of the amorphous polyester resin B is not particularly limited, and may be appropriately selected depending on the intended purpose. The acid value thereof is preferably from 1 mgKOH/g through 50 mgKOH/g, and more preferably from 5 mgKOH/g through 30 mgKOH/g. When the acid value is 1 mgKOH/g or greater, a resultant toner tends to be negatively charged to improve affinity between paper and the toner when the toner is fixed on the paper, and therefore low-temperature fixability can be improved. When the acid value is 50 mgKOH/g or less, desirable charging stability, particularly charging stability against environmental fluctuations, can be obtained.

A hydroxyl value of the amorphous polyester resin B is not particularly limited, and may be appropriately selected depending on the intended purpose. The hydroxyl value thereof is preferably 5 mgKOH/g or greater.

A glass transition temperature (Tg) of the amorphous polyester resin B is preferably 40° C. or higher but 80° C. or lower, and more preferably 50° C. or higher but 70° C. or lower. When the glass transition temperature thereof is 40° C. or higher, sufficient heat resistant storage stability and sufficient durability of a resultant toner against stress (e.g., stress applied by stirring inside a developing device) can be obtained, and excellent anti-filming properties can be obtained. When the glass transition temperature thereof is 80° C. or lower, a resultant toner is sufficiently deformed by heat and pressure applied during fixing, and excellent low-temperature fixability is obtained.

A molecular structure of the amorphous polyester resin B can be confirmed by solution or solid NMR spectroscopy, X-ray diffraction spectroscopy, GC/MS, LC/MS, or IR spectroscopy. As a simple method for confirming, as the amorphous polyester resin, the molecular structure thereof, there is a method for detecting a compound that does not have absorption, which is based on δCH (out plane bending) of olefin, at 965±10 $cm^{-1}$ or 990±10 $cm^{-1}$ in an infrared absorption spectrum thereof.

An amount of the amorphous polyester resin B is not particularly limited, and may be appropriately selected depending on the intended purpose. The amount thereof is preferably from 50 parts by mass through 90 parts by mass, and more preferably from 60 parts by mass through 80 parts by mass, relative to 100 parts by mass of the toner. When the amount of the amorphous polyester resin B is 50 parts by mass or greater, dispersibility of a pigment and a release agent in a resultant toner can be desirably maintained to prevent fogging or disturbance of an image. When the amount thereof is 90 parts by mass or less, the appropriate amounts of the crystalline polyester resin C and the amorphous polyester resin A are secured to maintain sufficient low-temperature fixability. The amount of the amorphous polyester resin B within the more preferable range is advantageous because excellent image quality and low-temperature fixability are both obtained.

In order to further improve low-temperature fixability, the amorphous polyester resin A is preferably used in combination with the crystalline polyester resin C. In order to achieve both low-temperature fixability and stability at high temperatures and high humidity, a glass transition temperature of the amorphous polyester resin A is preferably very low. Since the glass transition temperature of the amorphous polyester resin A is very low, the amorphous polyester resin A has characteristics that the amorphous polyester resin A deforms at a low temperature. Therefore, a resultant toner has characteristics that the toner deforms upon application of heat and pressure applied during fixing, and therefore the toner is easily adhered to paper at a low temperature. Since the reactive precursor has a non-linear molecular structure according one embodiment of the amorphous polyester resin A, the amorphous polyester resin A has a branched structure in a molecule skeleton and a molecular chain thereof has a three-dimensional network structure. Therefore, the amorphous polyester resin A has rubber-like characteristics that the amorphous polyester resin A deforms but does not flow at a low temperature. Accordingly, a resultant toner can maintain heat resistant storage stability and hot offset resistance.

When the amorphous polyester resin A has a urethane bond or urea bond having high cohesive energy, excellent adhesion of a resultant toner to a recording medium, such as paper, is achieved. Since the urethane bond or the urea bond behaves as a pseudo-crosslinking point to enhance rubber-like characteristics of the amorphous polyester resin A, heat resistant storage stability and hot offset resistance of a resultant toner improve.

Specifically, the toner of the present disclosure has excellent low-temperature fixability when the amorphous polyester resin A, the crystalline polyester resin C, and optionally another amorphous polyester resin B are used in combination. Since the amorphous polyester resin A having a glass transition temperature in a low temperature range is used in the toner, moreover, the toner can maintain desirable heat resistant storage stability and hot offset resistance even through the glass transition temperature of the toner of the present disclosure is lower than a glass transition temperature of a toner in the related art, and the toner of the present disclosure has excellent low-temperature fixability because the toner has a low glass transition temperature.

<Colorant>

The colorant is not particularly limited, and may be appropriately selected depending on the intended purpose. Examples of the colorant include carbon black, a nigrosine dye, iron black, naphthol yellow S, Hansa yellow (10G, 5G, G), cadmium yellow, yellow iron oxide, yellow ocher, yellow lead, titanium yellow, polyazo yellow, oil yellow, Hansa yellow (GR, A, RN, R), pigment yellow L, benzidine yellow (G, GR), permanent yellow (NCG), Vulcan fast yellow (5G, R), tartrazine lake, quinoline yellow lake, anthrasan yellow BGL, isoindolinon yellow, red iron oxide, red lead, lead vermilion, cadmium red, cadmium mercury red, antimony vermilion, permanent red 4R, parared, fiser red, parachloroorthonitro aniline red, lithol fast scarlet G, brilliant fast scarlet, brilliant carmine BS, permanent red (F2R, F4R, FRL, FRLL and F4RH), fast scarlet VD, vulcan fast rubin B, brilliant scarlet G, lithol rubin GX, permanent red F5R, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS and BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, and lithopone.

An amount of the colorant is not particularly limited, and may be appropriately selected depending on the intended purpose. The amount of the colorant is preferably from 1 part by mass through 15 parts by mass, and more preferably from 3 parts by mass through 10 parts by mass, relative to 100 parts by mass of the toner.

The colorant may be also used as a master batch in which the colorant forms a composite with a resin. Examples of a resin used for production of the master batch or kneaded together with the master batch include, in addition to the amorphous polyester resin: polymers of styrene or substituted styrene, such as polystyrene, poly(p-chlorostyrene), and polyvinyl toluene; styrene-based copolymers, such as styrene-p-chlorostyrene copolymer, styrene-propylene copolymer, styrene-vinyl toluene copolymer, styrene-vinyl naphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-methyl vinyl ketone copolymer, styrene-butadiene copolymer, styrene-isoprene copolymer, styrene-acrylonitrile-indene copolymer, styrene-maleic acid copolymer, and styrene-maleic acid ester copolymer; polymethyl methacrylate: polybutyl methacrylate; polyvinyl chloride; polyvinyl acetate; polyethylene; polypropylene; polyester; an epoxy resin; an epoxypolyol resin; polyurethane; polyamide; polyvinyl butyral; polyacrylic resin; rosin; modified rosin; a terpene resin; an aliphatic or alicyclic hydrocarbon resin; an aromatic petroleum resin; chlorinated paraffin; and paraffin wax. The above-listed examples may be used alone or in combination.

The master batch can be obtained by applying high shear force to a resin for a master batch and a colorant to mix and kneading the mixture. In order to enhance interaction between the colorant and the resin, an organic solvent may be used. Moreover, a so-called flashing method is preferably used, since a wet cake of the colorant can be directly used without being dried. The flashing method is a method where an aqueous paste containing a colorant is mixed or kneaded with a resin and an organic solvent, and then the colorant is transferred to the resin to remove the moisture and the organic solvent. A high-shearing disperser (e.g., a three-roll mill) is preferably used for the mixing and kneading.

<Inorganic Filler>

The inorganic filler is preferably a layered inorganic mineral, and more preferably a layered inorganic mineral, in which part of ions present between layers of the layered inorganic mineral are modified with organic ions, such as organic-modified montmorillonite, and organic-modified smectite. Examples of other inorganic filler that can be used in combination include silica, alumina, titanium oxide, barium titanate, magnesium titanate, calcium titanate, strontium titanate, zinc oxide, quartz sand, clay (including montmorillonite or organic modified products thereof), mica, wollastonite, diatomite, chromium oxide, cerium oxide, red iron oxide, antimony trioxide, magnesium oxide, zirconium oxide, barium sulfate, barium carbonate, calcium carbonate, silicon carbide, and silicon nitride.

An amount of the inorganic filler is not particularly limited, and may be appropriately selected depending on the intended purpose. The amount of the inorganic filler is preferably from 0.3 parts by mass through 1.5 parts by mass, and more preferably from 0.3 parts by mass through 0.7 parts by mass, relative to 100 parts by mass of the toner.

<Release Agent>

The release agent is not particularly limited and may be appropriately selected from release agents known in the art.

Examples of the release agent (e.g., wax) include natural wax, such as vegetable wax (e.g., carnauba wax, cotton wax, and Japanese wax), animal wax (e.g., bees wax and lanolin wax), mineral wax (e.g., ozocerite and ceresin), and petroleum wax (e.g., paraffin wax, microcrystalline wax, and petrolatum wax).

Moreover, the examples include, in addition to the above-listed natural wax, synthetic hydrocarbon wax (e.g., Fischer-Tropsch wax, polyethylene wax, and polypropylene wax), and synthetic wax (e.g., ester, ketone, and ether).

Furthermore, usable may be fatty acid amide-based compounds (e.g., 12-hydroxystearic acid amide, stearic acid amide, phthalimide anhydride, and chlorinated hydrocarbon), a low molecular-weight crystalline polyester resin, such as a homopolymer of polyacrylate (e.g., poly-n-stearylmethacrylate, and poly-n-laurylmethacrylate) or copolymer thereof (e.g., n-stearylacrylate-ethylmethacrylate copolymer), and a crystalline polymer having a long alkyl chain at a side chain thereof.

Among the above-listed examples, hydrocarbon wax, such as paraffin wax, microcrystalline wax, Fischer-Tropsch wax, polyethylene wax, and polypropylene wax, is preferable.

A melting point of the release agent is not particularly limited, and may be appropriately selected depending on the intended purpose. The melting point thereof is preferably 60° C. or higher but 80° C. or lower. When the melting point thereof is 60° C. or higher, the release agent does not melt at a low temperature and therefore desirable heat resistant storage stability of a resultant toner is obtained. When the melting point thereof is 80° C. or lower, the release agent is sufficiently melted and does not cause fixing offset when the resin is melted at the fixing temperature range, and therefore formation of defected images can be prevented.

An amount of the release agent is not particularly limited, and may be appropriately selected depending on the intended purpose. The amount of the release agent is preferably from 2 parts by mass through 10 parts by mass, and more preferably from 3 parts by mass through 8 parts by mass, relative to 100 parts by mass of the toner. When the amount thereof is 2 parts by mass or greater, desirable hot offset resistance during fixing and desirable low-temperature fixability can be obtained. When the amount thereof is 10 parts by mass or less, desirable heat resistant storage stability can be obtained, and image fogging can be prevented. The amount of the release agent within the more preferable range is advantageous because image quality and fixing stability are improved.

<Other Components>

Examples of other components included in the toner base particles include a charge controlling agent, a flowability improving agent, a cleaning improving agent, and a magnetic material. Materials known in the art may be used as the above-mentioned other components.

<Glass Transition Temperature [Tg1st (Toner)]>

A glass transition temperature [Tg1st (toner)] of the toner measured from the first heating of differential scanning calorimetry (DSC) is 20° C. or higher but 65° C. or lower, and more preferably 50° C. or higher but 65° C. or lower.

Moreover, a difference (Tg1st−Tg2nd) between the glass transition temperature [Tg1st (toner)] of the toner measured from the first heating of DSC and the glass transition temperature [Tg2nd (toner)] of the toner measured from the second heating of DSC is not particularly limited, and may be appropriately selected depending on the intended purpose. The difference (Tg1st−Tg2nd) is preferably 10° C. or greater. The upper limit of the difference is not particularly limited, and may be appropriately selected depending on the intended purpose. The upper limit of the difference (Tg1st−Tg2nd) is preferably 50° C. or less.

The difference (Tg1st−Tg2nd) of 10° C. or greater is advantageous because excellent low-temperature fixability can be imparted to a resultant toner. The difference (Tg1st−Tg2nd) of 10° C. or greater means that the crystalline polyester resin and the amorphous polyester resin, which are present in a non-compatible state before heating (before the first heating) are turned into a compatible state after heating (after the first heating). The compatible state after heating does not need to be a completely compatible state.

<External Additives>

The external additives are not particularly limited, and may be appropriately selected depending on the intended purpose. Examples thereof include silica particles, hydrophobic silica, fatty acid metal salt (e.g., zinc stearate, and aluminium stearate), metal oxide (e.g., titania, alumina, tin oxide, and antimony oxide), and a fluoropolymer.

<Production Method of Toner>

A production method of the toner is not particularly limited, and may be appropriately selected depending on the intended purpose. For example, the toner is preferably produced by dispersing, in an aqueous medium, an oil phase including the polyester resins A, B, and C, further including a colorant and inorganic filler, and optionally including a release agent.

Moreover, the toner is more preferably produced by dispersing, in an aqueous medium, an oil phase including a polyester resin that is a prepolymer having a urethane bond and/or a urea bond and a polyester resin free from a urethane bond and/or a urea bond as the polyester resins A and B, preferably including the crystalline polyester resin, and optionally including the curing agent, a release agent, a colorant, etc.

Examples of the above-described production method of the toner include a dissolution suspension method known in the art. As an example thereof, there is a method where toner base particles are formed while the prepolymer and the curing agent are reacted through an elongation reaction and/or a cross-linking reaction to generate a polyester resin.

According to the above-mentioned production method, preparation of the aqueous medium, preparation of the oil phase including toner materials, emulsification and/or dispersion of the toner materials, and removal of an organic solvent are performed.

—Preparation of Aqueous Medium (Aqueous Phase)—

For example, the aqueous medium can be prepared by dispersing resin particles in an aqueous medium. An amount of the resin particles added to the aqueous medium is not particularly limited, and may be appropriately selected depending on the intended purpose. The amount of the resin particles is preferably from 0.5 parts by mass through 10 parts by mass relative to 100 parts by mass of the aqueous medium.

The aqueous medium is not particularly limited, and may be appropriately selected depending on the intended purpose. Examples thereof include water, a solvent miscible with water, and a mixture thereof. The above-listed examples may be used alone or in combination. Among the above-listed examples, water is preferable.

The solvent miscible with water is not particularly limited, and may be appropriately selected depending on the intended purpose. Examples thereof include alcohol, dimethylformamide, tetrahydrofuran, cellosolves, and lower ketones.

Examples of the alcohol include methanol, isopropanol, and ethylene glycol. Examples of the lower ketones include acetone, and methyl ethyl ketone.

—Preparation of Oil Phase—

The oil phase including toner materials according to the present embodiment can be prepared by dissolving and/or dispersing, in an organic solvent, toner materials including polyester resins A and B that are prepolymers having a urethane bond and/or a urea bond, and a polyester resin C free from a urethane bond and/or a urea bond, and optionally including the crystalline polyester resin, a curing agent, a release agent, a colorant, etc.

The organic solvent is not particularly limited, and may be appropriately selected depending on the intended purpose. Considering easiness of removal, an organic solvent having a boiling point of lower than 150° C. is preferable.

Examples of the organic solvent having a boiling point of lower than 150° C. include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methylethylketone, and methyl isobutyl ketone.

The above-listed examples may be used alone or in combination.

Among the above-listed examples, ethyl acetate, toluene, xylene, benzene, methylene chloride, 1,2-dichloroethane, chloroform, and carbon tetrachloride are preferable, and ethyl acetate is more preferable.

—Emulsification and/or Dispersion—

The emulsification and/or dispersion of the toner materials can be performed by dispersing the oil phase including the toner materials in the aqueous medium. When the toner materials are emulsified and/or dispersed, the curing agent and the prepolymer can be reacted through an elongation reaction and/or a cross-linking reaction.

Reaction conditions for generating the prepolymer (e.g., a reaction time and a reaction temperature) are not particularly limited, and are appropriately selected depending on a combination of the curing agent and the prepolymer. The reaction time is preferably from 10 minutes through 40 hours, and more preferably from 2 hours through 24 hours. The reaction temperature is preferably from 0° C. through 150° C., and more preferably from 40° C. through 98° C.

A method for stably forming dispersed elements including the prepolymer in the aqueous medium is not particularly limited, and may be appropriately selected depending on the intended purpose. Examples thereof include a method where an oil phase prepared by dissolving and/or dispersing toner materials in a solvent is added to an aqueous medium phase, and the resultant is dispersed by shearing force.

A disperser used for the dispersing is not particularly limited, and may be appropriately selected depending on the intended purpose. Examples thereof include a low-speed shearing disperser, a high-speed shearing disperser, a friction disperser, a high-pressure jet disperser, and an ultrasonic disperser. Among the above-listed examples, a high-speed shearing disperser is preferable as the particle diameter of the dispersed elements (oil droplets) can be adjusted to the range of from 2 μm through 20 μm.

In the case where the high-speed shearing disperser is used, conditions (e.g., rotational speed, a dispersion time, and a dispersion temperature) are appropriately selected depending on the intended purpose. The rotational speed is preferably from 1,000 rpm through 30,000 rpm, and more preferably from 5,000 rpm through 20,000 rpm. In case of a batch system, the dispersion time is from 0.1 minutes through 5 minutes. The dispersion temperature is preferably from 0° C. through 150° C., and more preferably from 40° C. through 98° C. under pressure. Generally speaking, dispersion is performed easily when the dispersion temperature is high.

An amount of the aqueous medium used for emulsifying and/or dispersing the toner materials is not particularly limited, and may be appropriately selected depending on the intended purpose. The amount of the aqueous medium is from 50 parts by mass through 2,000 parts by mass, and more preferably from 100 parts by mass through 1,000 parts by mass, relative to 100 parts by mass of the toner materials. When the amount of the aqueous medium is 50 parts by mass or greater, an appropriate dispersion state of the toner materials can be achieved to obtain intended particle diameters of toner base particles. When the amount of the aqueous medium is 2,000 parts by mass or less, the production cost can be kept low.

When the oil phase including the toner materials is emulsified and/or dispersed, a dispersant is preferably used for stabilizing dispersed elements, such as oil droplets, to obtain desired shapes and make a particle size distribution sharp.

The dispersant is not particularly limited, and may be appropriately selected depending on the intended purpose. Examples thereof include a surfactant, a poorly water-soluble inorganic compound disperser, and a polymeric protective colloid. The above-listed examples may be used alone or in combination. Among the above-listed examples, a surfactant is preferable.

The surfactant is not particularly limited and may be appropriately selected depending on the intended purpose. For example, an anionic surfactant, a cationic surfactant, a nonionic surfactant, or an amphoteric surfactant may be used.

Examples of the anionic surfactant include alkyl benzene sulfonic acid salt, α-olefin sulfonic acid salt, and phosphoric acid ester.

Among the above-listed examples, a surfactant including a fluoroalkyl group is preferable.

—Removal of Organic Solvent—

A method for removing the organic solvent from the dispersion liquid, such as the emulsified slurry, is not particularly limited and may be appropriately selected depending on the intended purpose. Examples thereof include: a method where the entire reaction system is gradually heated to evaporate the organic solvent inside the oil droplets; and a method where the dispersion liquid is sprayed in a dry atmosphere to remove the organic solvent in the oil droplets.

Once the organic solvent is removed, toner base particles are formed. The toner base particles can be then subjected to washing, drying etc., and may be further subjected to classification etc.

The classification may be performed by removing the fine particle component using cyclone in a liquid, a decanter, or by centrifugation. Alternatively, the classification may be performed after drying.

—External Additive Treatment—

The obtained toner base particles may be mixed with particles, such as the external additives, and the charge controlling agent. By applying mechanical impact during the mixing, the particles, such as the external additives, are prevented from being detached from surfaces of the toner base particles.

A method for applying the mechanical impact is not particularly limited, and may be appropriately selected depending on the intended purpose. Examples thereof include: a method for applying impact force to the mixture using a blade rotated at high speed; and a method where the mixture is added to a high-speed air flow to accelerate the particles to make the particles crush into each other or make the particles crush into an appropriate impact board.

A device used for the above-mentioned method is not particularly limited, and may be appropriately selected depending on the intended purpose. Examples thereof include an angmill (available from HOSOKAWA MICRON CORPORATION), a device obtained by modifying an I-type mill (available from Nippon Pneumatic Mfg. Co., Ltd.), a hybridization system (available from NARA MACHINERY CO., LTD.), Kryptron System (available from Kawasaki Heavy Industries, Ltd.), and an automatic mortar.

In the present disclosure, the volume average particle diameter of the toner is preferably 4.5 μm or greater but 6.3 μm or less, and more preferably 5.0 μm or greater but 5.8 μm or less.

(Developer)

The developer of the present disclosure includes at least the toner of the present disclosure, and may further include appropriately selected other components, such as a carrier, according to the necessity. Therefore, the developer can achieve excellent transfer performance, and chargeability, and can stably form a high quality image. The developer may be a one-component developer or two-component developer. In the case where the developer is used for a high-speed printer corresponding to a recent improvement in information processing speed, use of a two-component developer is preferable considering an improvement of service life.

When the developer is used as a one-component developer, there is no change or a slight change in the particle diameter of the toner even after consuming and refilling the toner, filming of the toner to a developing roller or fusion of the toner to a member, such as a blade for thinning a layer of the toner, is rarely caused, and excellent and stable developing properties and images are obtained even after the developer is stirred for a long period in a developing device.

When the developer is used as a two-component developer, there is no change or a slight change in the particle diameter of the toner even after consuming and refilling the toner, and excellent and stable developing properties and images are obtained even after the developer is stirred for a long period in a developing device.

<Carrier>

The carrier is not particularly limited and may be appropriately selected depending on the intended purpose. The carrier includes carrier particles, and each carrier particle preferably includes a core and a resin layer covering the core.

—Cores—

A material of the cores is not particularly limited, and may be appropriately selected depending on the intended purpose. Examples of the material of the cores include a manganese-strontium-based material of from 50 emu/g through 90 emu/g, and a manganese-magnesium-based material of from 50 emu/g through 90 emu/g. In order to ensure a desired image density, moreover, a high magnetic material, such as iron powder of 100 emu/g or greater and magnetite of from 75 emu/g through 120 emu/g is preferably used. Moreover, a low magnetic material, such as a copper/zinc-based material of from 30 emu/g through 80 emu/g is preferably used, because an impact of the developer, which is in the form of a brush, applied to the photoconductor can be weakened, and a high quality image can be formed.

The above-listed examples may be used alone or in combination.

The volume average particle diameter of the cores is not particularly limited, and may be appropriately selected depending on the intended purpose. The volume average particle diameter thereof is preferably from 10 μm through 150 μm, and more preferably from 40 μm through 100 μm. When the volume average particle diameter of the cores is 10 μm or greater, an amount of the fine powder in the carrier can be maintained at an appropriate level to keep appropriate magnetization per particle, and therefore carrier scattering can be prevented. When the volume average particle diameter thereof is 150 μm or less, reduction in a specific surface area of the carrier is prevented to prevent toner scattering, and reproducibility of a full-color image having a large solid image area, especially reproducibility of a solid image area, can be prevented from being impaired.

The toner of the present disclosure may be blended with the carrier to be used as a two-component developer.

An amount of the carrier in the two-component developer is not particularly limited, and may be appropriately selected depending on the intended purpose. The amount of the carrier is preferably from 90 parts by mass through 98 parts by mass, and more preferably from 93 parts by mass through 97 parts by mass, relative to 100 parts by mass of the two-component developer.

The developer of the present disclosure is suitably used for image formation according to various electrophotographic methods known in the art, such as a magnetic one-component developing method, a non-magnetic one-component developing method, and a two-component developing method.

(Image Forming Apparatus and Image Forming Method)

The image forming apparatus of the present disclosure includes at least an electrostatic latent image bearer, an electrostatic latent image forming unit, and a developing unit, and may further include other units according to the necessity. The toner used for developing is the above-described toner of the present disclosure.

The image forming method associated with the present disclosure includes at least an electrostatic latent image forming step, and a developing step, and may further include other steps according to the necessity. The toner used for developing is the above-described toner of the present disclosure.

<Electrostatic Latent Image Bearer>

A material, structure, and size of the electrostatic latent image bearer are not particularly limited, and may be appropriately selected from materials, structures, and sizes thereof known in the art. Examples of the material thereof include inorganic photoconductors (e.g., amorphous silicon and selenium) and organic photoconductors (e.g., polysilane and phthalopolymethine). Among the above-listed examples, amorphous silicon is preferable considering long service life of a resultant electrostatic latent image bearer.

The linear speed of the electrostatic latent image bearer is preferably 300 mm/s or greater.

<Electrostatic Latent Image Forming Unit and Electrostatic Latent Image Forming Step>

The electrostatic latent image forming unit is not particularly limited, as long as the electrostatic latent image forming unit is a unit configured to form an electrostatic latent image on the electrostatic latent image bearer. The electrostatic latent image forming unit may be appropriately selected depending on the intended purpose. Examples thereof include a unit including at least a charging member configured to charge a surface of the electrostatic latent image bearer, and an exposing member configured to expose the surface of the electrostatic latent image bearer to light in the shape of an image to be formed.

The electrostatic latent image forming step is not particularly limited as long as the electrostatic latent image forming step is a step including forming an electrostatic latent image on the electrostatic latent image bearer. The electrostatic latent image forming step may be appropriately selected depending on the intended purpose. For example, the electrostatic latent image forming step may be performed by, after charging a surface of the electrostatic latent image bearer, exposing the electrostatic latent image bearer to light in the shape of an image to be formed. The electrostatic latent image forming step can be performed using the electrostatic latent image forming unit.

<<Charging Member and Charging>>

The charging member is not particularly limited, and may be appropriately selected depending on the intended purpose. Examples of the charging member include: contact chargers known in the art equipped with a conductive or semiconductive roller, brush, film, or rubber blade, etc.: and non-contact chargers utilizing corona discharge, such as corotron and scorotron.

For example, the charging can be performed by applying voltage to a surface of the electrostatic latent image bearer using the charging member.

As a shape of the charging member, the charging member may be in any shape, such as a magnetic brush, and a fur brush, as well as a roller. The shape of the charging member may be selected depending on the specification or embodiment of the image forming apparatus.

The charging member is not limited to the above-mentioned contact charging member, but a contact charging member is preferably used because an image forming apparatus including the contact charging member can reduce an amount of ozone generated from the charging member.

<<Exposing Member and Exposing>>

The exposing member is not particularly limited and may be appropriately selected depending on the intended purpose, as long as the exposing member is capable of exposing the surface of the electrostatic latent image bearer to light in the shape of an image to be formed. Examples thereof include various exposing members, such as a copy optical exposing member, a rod lens array exposing member, a laser optical exposing member, and a liquid crystal shutter optical exposing member.

A light source used for the exposing member is not particularly limited, and may be appropriately selected depending on the intended purpose. Examples thereof include general light emitters, such as a fluorescent lamp, a tungsten lamp, a halogen lamp, a mercury lamp, a sodium vapor lamp, a light emitting diode (LED), a semiconductor laser (LD), and an electroluminescent light (EL).

In order to apply only light having a desired wavelength range, moreover, various filters, such as a sharp-cut filter, a band-pass filter, a near infrared ray-cut filter, a dichroic filter, an interference filter, and a color temperature conversion filter, may be used.

For example, the exposing may be performed by exposing the surface of the electrostatic latent image bearer to light in the shape of an image to be formed using the exposing member.

In the present disclosure, a back-exposure system may be employed. The back-exposure system is a system where imagewise light exposure is performed from the back side of the electrostatic latent image bearer.

<Developing Unit and Developing Step>

The developing unit is not particularly limited, as long as the developing unit is a developing unit configured to develop the electrostatic latent image formed on the electrostatic latent image with a toner to form a toner image that is a visible image, and the developing unit accommodates the toner. The developing unit may be appropriately selected depending on the intended purpose.

The developing step is not particularly limited as long as the developing step is a step including developing the electrostatic latent image formed on the electrostatic latent image bearer with a toner to form a toner image that is a visible image. The developing step may be appropriately selected depending on the intended purpose.

The developing unit is preferably a developing device including a stirrer configured to stir the toner to charge the toner with friction, and a developer bearer that includes a magnetic field generating unit disposed inside of the developer bearer, is configured to bear a developer including the toner on a surface thereof, and is rotatable.

<Other Units and Other Steps>

Examples of the above-mentioned other units include a transferring unit, a fixing unit, a cleaning unit, a charge-eliminating unit, a recycling unit, and a controlling unit.

Examples of the above-mentioned other steps include a transferring step, a fixing step, a cleaning step, a charge-eliminating step, a recycling step, and a controlling step.

<<Transferring Unit and Transferring Step>>

The transferring unit is not particularly limited, and may be appropriately selected depending on the intended purpose, as long as the transferring unit is a unit configured to transfer the visible image onto a recording medium. Among embodiments of the transferring unit, an embodiment thereof including a first transferring unit and a second transferring unit is preferable, where the first transferring unit is configured to transfer the visible images onto an intermediate transfer member to form a composite transfer image, and the second transferring unit is configured to transfer the composite transfer image onto a recording medium.

The transferring step is not particularly limited, and may be appropriately selected depending on the intended purpose, as long as the transferring step is a step including transferring the visible image onto a recording medium. Among embodiments of the transferring step, an embodiment thereof including primary transferring visible images onto an intermediate transfer member, followed by secondary transferring the visible images onto a recording medium is preferable.

For example, the transferring step can be performed by charging the photoconductor with a transfer charger to charge the visible image, and the transferring step can be performed by the transferring unit.

When an image secondary-transferred onto the recording medium is a color image composed of multiple color toners, toners of several colors are sequentially superimposed on the intermediate transfer member by the transferring unit to form images on the intermediate transfer member, and the images on the intermediate transfer member are collectively secondary-transferred onto the recording medium by the intermediate transfer member.

The intermediate transfer member is not particularly limited and may be appropriately selected from known transfer members according to the intended purpose. For example, a transfer belt is preferably used as the intermediate transfer member.

The transferring unit (e.g., the primary transferring unit, and the secondary transferring unit) preferably includes at least a transferor configured to charge the visible image formed on the photoconductor to release the visible image from the electrostatic latent image bearer to the side of a recording medium. Examples of the transferor include a corona transferor using corona discharge, a transfer belt, a transfer roller, a press transfer roller, and an adhesion transferor.

The recording medium is typically plane paper. The recording medium is not particularly limited as long as the recording medium is a medium to which an unfixed image after developing can be transferred.

The recording medium may be appropriately selected depending on the intended purpose. A PET base for OHP may be also used as the recording medium.

<<Fixing Unit and Fixing Step>>

The fixing unit is not particularly limited, as long as the fixing unit is a unit configured to fix the transfer image transferred onto the recording medium. The fixing unit may be appropriately selected depending on the intended purpose. The fixing unit is preferably a known heat press member. Examples of the heat press member include a combination of a heating roller and a press roller, and a combination of a heat roller, a press roller, and an endless belt.

The fixing step is not particularly limited, as long as the fixing step is a step including fixing the visible image transferred onto the recording medium. The fixing step may be appropriately selected depending on the intended purpose. For example, the fixing step may be performed every time the toner of each color is transferred onto the recording medium, or the fixing step may be performed once with the toners of all colors being laminated.

The fixing step can be performed by the fixing unit.

Heating by the press heat member is preferably performed at a temperature that is from 80° C. through 200° C.

In the present disclosure, for example, a known optical fixing device may be used in combination with or instead of the fixing unit according to the intended purpose.

The surface pressure applied during the fixing step is not particularly limited, and may be appropriately selected depending on the intended purpose. The surface pressure is preferably from 10 $N/cm^2$ through 80 $N/cm^2$.

<<Cleaning Unit and Cleaning Step>>

The cleaning unit is not particularly limited, as long as the cleaning unit is a unit capable of removing the toner remained on the photoconductor. The cleaning unit may be appropriately selected depending on the intended purpose. Examples of the cleaning unit include a magnetic brush cleaner, an electrostatic brush cleaner, a magnetic roller cleaner, a blade cleaner, a brush cleaner, and a web cleaner.

The cleaning step is not particularly limited, as long as the cleaning step is a step including removing the toner remained on the photoconductor. The cleaning step may be appropriately selected depending on the intended purpose. For example, the cleaning step can be performed by the cleaning unit.

<<Charge-Eliminating Unit and Charge-Eliminating Step>>

The charge-eliminating unit is not particularly limited, as long as the charge-eliminating unit is a unit configured to apply charge-eliminating bias to the photoconductor to eliminate the charge of the photoconductor. The charge-eliminating unit may be appropriately selected depending on the intended purpose. Examples of the charge-eliminating unit include a charge-eliminating lamp.

The charge-eliminating step is not particularly limited, as long as the charge-eliminating step is a step including applying charge-eliminating bias to the photoconductor to eliminate the charge of the photoconductor. The charge-eliminating step may be appropriately selected depending on the intended purpose. For example, the charge-eliminating step can be performed by the charge-eliminating unit.

<<Recycling Unit and Recycling Step>>

The recycling unit is not particularly limited, as long as the recycling unit is a unit configured to recycle the toner removed by the cleaning step to the developing device. The recycling unit may be appropriately selected depending on the intended purpose. Examples of the recycling unit include known conveying units.

The recycling step is not particularly limited, as long as the recycling step is a step including recycling the toner removed by the cleaning step to the developing device. The recycling step may be appropriately selected depending on the intended purpose. For example, the recycling step can be performed by the recycling unit.

<<Controlling Unit and Controlling Step>>

The controlling unit is not particularly limited, as long as the controlling unit is a unit configured to control the operation of each of the above-mentioned units. The controlling unit may be appropriately selected depending on the intended purpose. Examples of the controlling unit include a sequencer, and a computer.

The controlling step is not particularly limited, as long as the controlling step is a step including controlling the operation of each of the above-mentioned steps. The controlling step may be appropriately selected depending on the intended purpose. For example, the controlling step can be performed by the controlling unit.

Next, one embodiment of a method for forming an image using the image forming apparatus of the present disclosure will be described with reference to FIG. 1. The color image forming apparatus 100A illustrated in FIG. 1 includes a photoconductor drum 10 (may be referred to as a "photoconductor 10" hereinafter) serving as the electrostatic latent image bearer, a charging roller 20 serving as the charging unit, an exposure device 30 serving as the exposing unit, a developing device 40 serving as the developing unit, an intermediate transfer member 50, a cleaning device 60 serving as the cleaning unit including a cleaning blade, and a charge-eliminating lamp 70 serving as the charge-eliminating unit.

The intermediate transfer member 50 is an endless belt supported by 3 rollers 51 disposed inside the loop of the intermediate transfer member 50, and can move in the direction indicated with the arrow in FIG. 1. Part of the 3 rollers 51 also functions as a transfer bias roller capable of applying the predetermined transfer bias (i.e., primary transfer bias) to the intermediate transfer member 50. The cleaning device 90 including the cleaning blade is disposed near the intermediate transfer member 50. Moreover, the transfer roller 80 is disposed near the intermediate transfer member 50 to face the intermediate transfer member 50, and the transfer roller 80 is capable of applying transfer bias (i.e., secondary transfer bias) for transferring (i.e., secondary transferring) the developed image (i.e., the toner image) onto transfer paper 95 serving as a recording medium. At the periphery of the intermediate transfer member 50, a corona charger 58 configured to apply charge to the toner image on the intermediate transfer member 50 is disposed between a contact area between the photoconductor 10 and the intermediate transfer member 50 and a contact area between the intermediate transfer member 50 and the transfer paper 95 along the rotational direction of the intermediate transfer member 50.

The developing device 40 includes a developing belt 41 serving as the developer bearer, and a black developing unit 45K, a yellow developing unit 45Y, a magenta developing unit 45M, and a cyan developing unit 45C disposed together at the periphery of the developing belt 41.

The black developing unit 45K includes a developer storage unit 42K, a developer supply roller 43K, and a developing roller 44K. The yellow developing unit 45Y includes a developer storage unit 42Y, a developer supply roller 43Y, and a developing roller 44Y. The magenta developing unit 45M includes a developer storage unit 42M, a developer supply roller 43M, and a developing roller 44M. The cyan developing unit 45C includes a developer storage unit 42C, a developer supply roller 43C, and a developing roller 44C.

Moreover, the developing belt 41 is an endless belt rotatably supported by a plurality of belt rollers, and part of the developing belt 41 comes in contact with the electrostatic latent image bearer 10.

In the color image forming apparatus 100A illustrated in FIG. 1, for example, the charging roller 20 uniformly charges the photoconductor drum 10. The photoconductor drum 10 is exposed to light in the shape of an image to be formed by the exposure device 30 to form an electrostatic latent image on the photoconductor drum 10.

The electrostatic latent image formed on the photoconductor drum 10 is developed with the toner supplied from the developing device 40 to form a toner image. Voltage is applied to the toner image by the roller 51 to transfer (primary transfer) the toner image onto the intermediate transfer member 50, followed by transferring (secondary transferring) onto transfer paper 95. As a result, a transfer image is formed on the transfer paper 95.

The toner remained on the photoconductor 10 is removed by the cleaning device 60, and the residual charge of the photoconductor 10 is eliminated by the charge-eliminating lamp 70.

Figure 2:
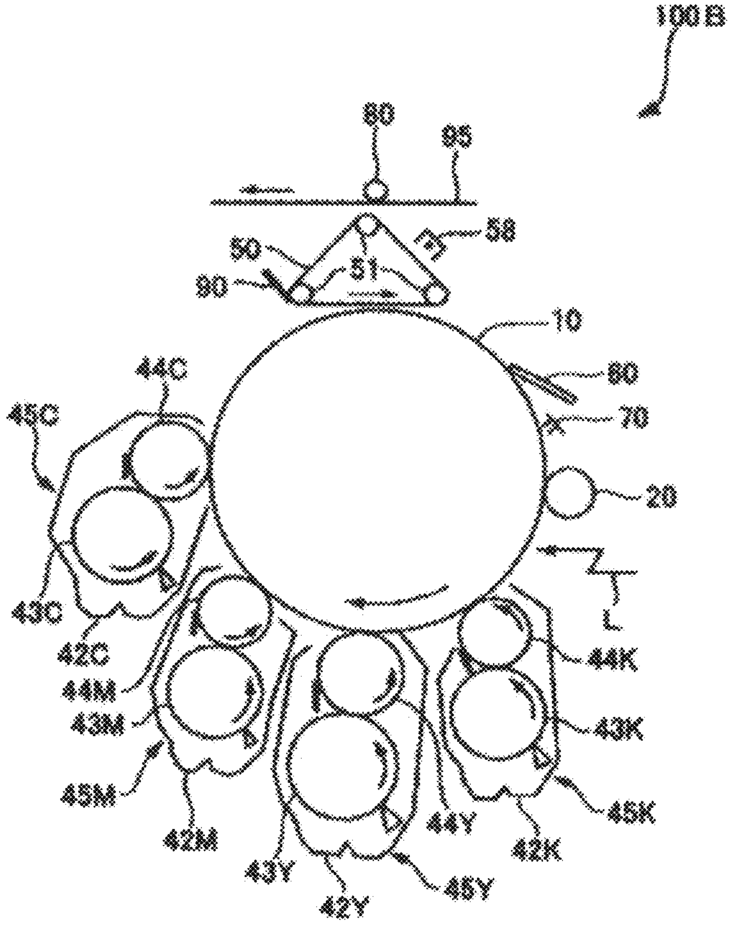
FIG. 2 is a schematic view illustrating another example of the image forming apparatus of the present disclosure.

FIG. 2 illustrates another example of the image forming apparatus of the present disclosure. The image forming apparatus 100B has the structure identical to the structure of the image forming apparatus 100A illustrated in FIG. 1, except that the developing belt 41 is not disposed, and the black developing unit 45K, the yellow developing unit 45Y, the magenta developing unit 45M, and the cyan developing unit 45C are disposed at the periphery of the photoconductor drum 10 to directly face the photoconductor drum 10.

Figure 3:
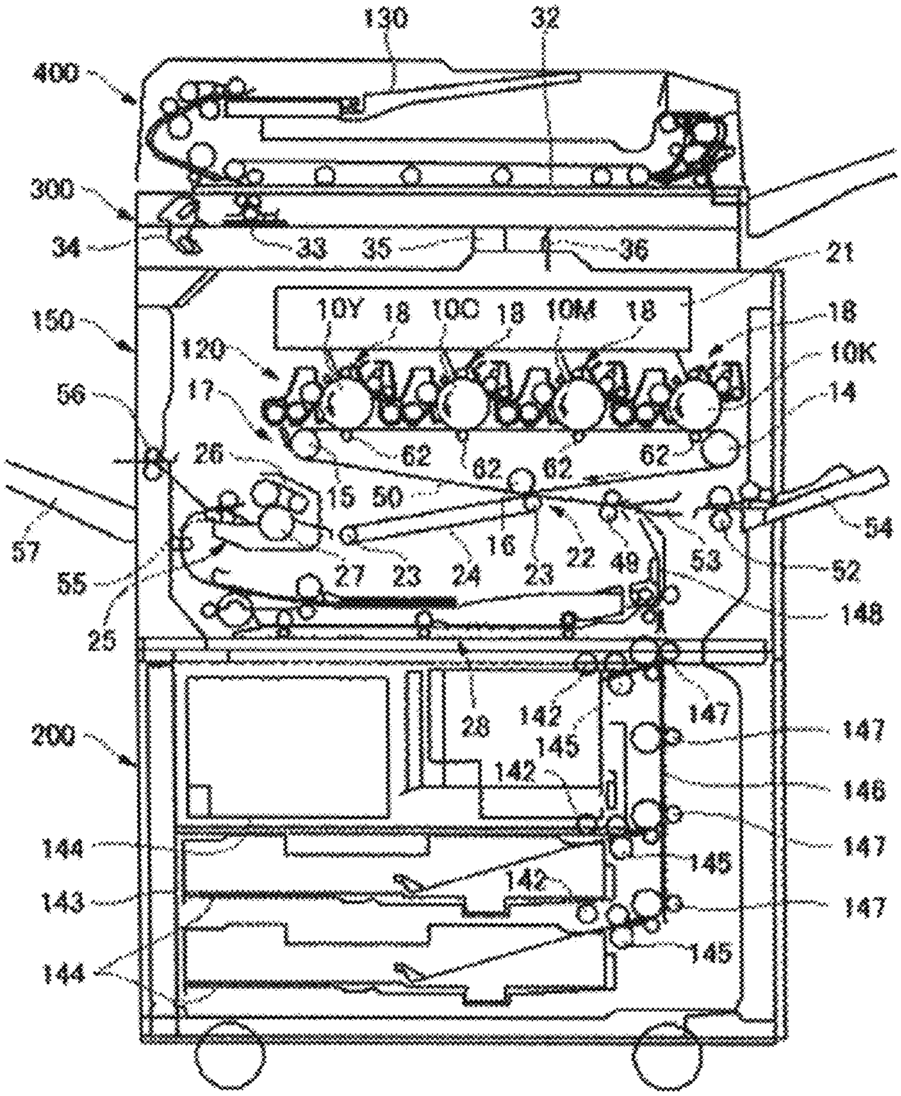
FIG. 3 is a schematic view illustrating another example of the image forming apparatus of the present disclosure.

Another example of the image forming apparatus of the present disclosure is illustrated in FIG. 3. The image forming apparatus illustrated in FIG. 3 includes a photocopier main body 150, a paper feeding table 200, a scanner 300, and an automatic document feeder (ADF) 400.

At the center of the photocopier main body 150, an intermediate transfer member 50, which is an endless belt, is disposed. The intermediate transfer member 50 is supported by supporting rollers 14, 15, and 16, and can move in the clockwise direction in FIG. 3. An intermediate transfer member cleaning device 17 configured to remove the toner remained on the intermediate transfer member 50 is disposed near the supporting roller 15.

A tandem developing device 120, in which four image forming units 18 of yellow, cyan, magenta, and black are aligned side by side to face the intermediate transfer member 50 along the conveying direction thereof, is disposed near the intermediate transfer member supported by the supporting roller 14 and the supporting roller 15. An exposing device 21, which is an exposing unit, is disposed near the tandem developing device 120. A secondary transferring device 22 is disposed at the opposite side of the intermediate transfer member 50 to the side where the tandem developing device 120 is disposed.

In the secondary transferring device 22, a secondary transfer belt 24, which is an endless belt, is supported by a pair of rollers 23, and transfer paper conveyed on the secondary transfer belt 24 comes in contact with the intermediate transfer member 50. A fixing device 25, which is the fixing unit, is disposed near the secondary transferring device 22. The fixing device 25 includes a fixing belt 26, which is an endless belt, and a press roller 27 disposed to press against the fixing belt 26.

In the tandem image forming apparatus, a sheet reverser 28, which is configured to flip the side of the transfer sheet to perform image formation on the both side of the transfer paper, is disposed near the secondary transferring device 22 and the fixing device 25.

Next, formation of a full-color image (color copy) by means of the tandem developing device 120 will be described. First, a document is set on a document table 130 of the automatic document feeder (ADF) 400. Alternatively, the automatic document feeder is open, a document is set on contact glass 32 of a scanner 300, and the automatic document feeder 400 is closed.

When the document is set on the automatic document feeder 400, the document is transported and moved onto the contact glass 32, and then a scanner 300 is driven. When the document is set on the contact glass 32, the scanner 300 is immediately driven. When the scanner 300 is driven, light emitted from a light source is applied to the document by a first carriage 33, and the light reflected from the surface of the document is reflected by a mirror of a second carriage 34, and the reflected light is received by a reading sensor 36 via an image forming lens 35 to read the color document (color image) to attain image information of black, yellow, magenta, and cyan.

Each image formation of black, yellow, magenta, and cyan is transmitted to the corresponding image forming unit 18 (the black image forming unit, the yellow image forming unit, the magenta image forming unit, and the cyan image forming unit) of the tandem developing device 120. In each image forming unit, each toner image of black, yellow, magenta, or cyan is formed.

Figure 4:
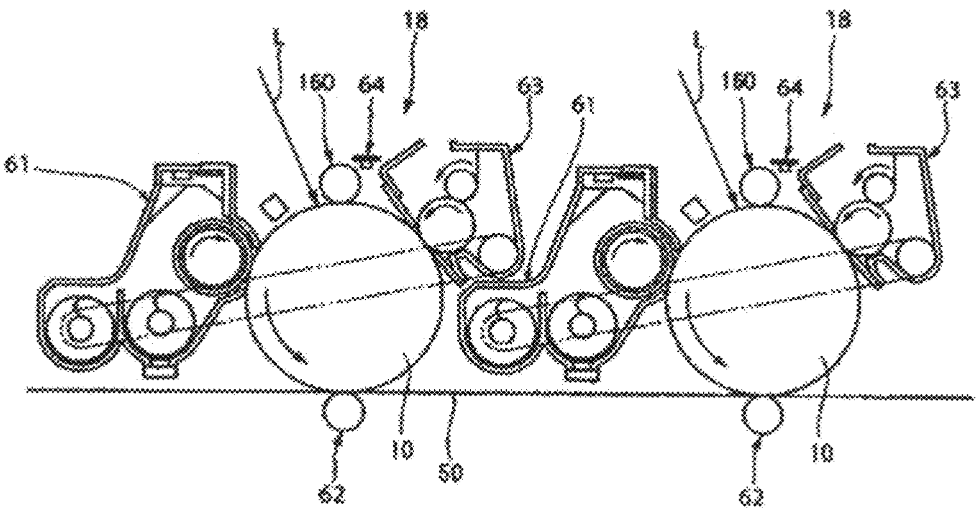
FIG. 4 is an enlarged partial view of FIG. 3.

As illustrated in FIG. 4, specifically, each image forming unit 18 (the black image forming unit, the yellow image forming unit, the magenta image forming unit, or the cyan image forming unit) in the tandem developing device 120 includes an electrostatic latent image bearer 10 (a black electrostatic latent image bearer 10K, a yellow electrostatic latent image bearer 10Y, a magenta electrostatic latent image bearer 10M, or a cyan electrostatic latent image bearer 10C), a charging device 160 that is the charging unit configured to uniformly charge the electrostatic latent image bearer 10

(the black electrostatic latent image bearer 10K, the yellow electrostatic latent image bearer 10Y, the magenta electrostatic latent image bearer 10M, and the cyan electrostatic latent image bearer 10C), an exposing device configured to expose the electrostatic latent image bearer to light (L in FIG. 4) corresponding to each color image to be formed based on each color image information to form an electrostatic latent image corresponding to each color image on the electrostatic latent image bearer, a developing device 61 that is the developing unit configured to develop the electrostatic latent image with each color toner (a black toner, a yellow toner, a magenta toner, or a cyan toner) to form a toner image formed of each color toner, a transfer charger 62 configured to transfer the toner image onto an intermediate transfer member 50, a cleaning device 63, and a charge-eliminating unit 64.

Each image forming unit 18 can form an image of each color (a black image, a yellow image, a magenta image, or a cyan image) based on each color image information.

The black image, yellow image, magenta image, and cyan image formed in the above-described manner, i.e., the black image formed on the black electrostatic latent image bearer 10K, the yellow image formed on the yellow electrostatic latent image bearer 10Y, the magenta image formed on the magenta electrostatic latent image bearer 10M, and the cyan image formed on the cyan electrostatic latent image bearer 10C, are sequentially transferred (primary transferred) onto the intermediate transfer member 50 that is driven and rotated by the supporting rollers 14, 15, and 16.

The black image, the yellow image, the magenta image, and the cyan image are superimposed on the intermediate transfer member 50 to form a composite color image (a color transfer image).

Meanwhile, one of the paper feeding rollers 142 is selectively rotated in the paper feeding table 200 to eject sheets (recording paper) from one of multiple paper feeding cassettes 144 of the paper bank 143. The sheets are separated one by one by a separation roller 145 to send each sheet to a paper feeding path 146, and then transported by a conveying roller 147 to guide into a paper feeding path 148 within the photocopier main body 150. The sheet transported in the paper feeding path 148 is than bumped against a registration roller 49 to stop. Alternatively, sheets (recording paper) on a manual feeding tray 54 is ejected by rotating the paper feeding roller 142, and the ejected sheets are separated one by one by the separation roller 52 to send to a manual paper feeding path 53. Similarly to the above, the sheet is bumped against the registration roller 49 to stop.

The registration roller 49 is generally earthed at the time of use, but the registration roller 49 may be biased in order to remove paper dusts of the sheets.

The registration roller 49 is rotated synchronously with the movement of the composite color image (color transfer image) formed on the intermediate transfer member 50 to send the sheet (the recording paper) between the intermediate transfer member 50 and a secondary transferring device 22 to transfer (secondary transfer) the composite color image (the color transfer image) onto the sheet (the recording paper).

The toner remained on the intermediate transfer member 50 after transferring the image is cleaned by the intermediate transfer member cleaning device 17.

The sheet (the recording paper) onto which the color image has been transferred is transported by the secondary transferring device 22 to send to the fixing device 25. The fixing device 25 applies heat and pressure to the composite color image (the color transfer image) to fix the composite color image (the color transfer image) on the sheet (the recording paper). Thereafter, the traveling path of the sheet (the recording paper) is switched by the separation craw 55 and the sheet (the recording paper) is ejected to a paper ejection tray 57 by an ejecting roller 56. Alternatively, the traveling path of the sheet is switched by the separation craw 55, and the side of the sheet is flipped by a sheet reverser 28 to guide the sheet again to the transfer position to record an image on the back side of the sheet. Thereafter, the sheet is ejected by the ejecting roller 56 to stack on the paper ejection tray 57.

(Toner Storage Unit)

In the present disclosure, the toner storage unit includes a unit having a function of storing a toner, and a toner stored in the unit. Examples of an embodiment of the toner storage unit include a toner storage container, a developing device, and a process cartridge.

The toner storage container includes a container, and a toner stored in the container.

The developing device is a developing unit that stores a toner, and is configured to develop with the toner.

The process cartridge includes at least an image bearer and a developing unit as an integrated body, stores a toner therein, and can be detachably mounted in an image forming apparatus. The process cartridge may further include at least one selected from the group consisting of a charging unit, an exposing unit, and a cleaning unit.

When the toner storage unit of the present disclosure is mounted in an image forming apparatus to perform image formation, the image formation is performed by using the toner of the present disclosure. Therefore, both desirable cleaning performance and low-temperature fixability are achieved, and an excellent image can be formed with the toner without causing toner scattering.

The toner storage container is not particularly limited and may be appropriately selected from toner storage containers known in the art. Examples of the toner storage container include a toner storage container including a container main body and a cap.

Moreover, a size, shape, structure, material etc. of the container main body are not particularly limited and may be appropriately changed. The shape thereof is preferably a cylinder. When a spiral groove with a convex-concave shape is formed on the inner circumferential surface of the container main body and the main body is rotated, the developer contained therein can move towards the side of the outlet. It is particularly preferable that the entire or part of spiral groove has a bellows function.

Moreover, the material of the container main body is not particularly limited, but the material thereof is preferably a material having excellent dimensional precision. Examples of the material include resin materials, such as a polyester resin, a polyethylene resin, a polypropylene resin, a polystyrene resin, a polyvinyl chloride resin, polyacrylic acid, a polycarbonate resin, an ABS resin, and a polyacetal resin.

Since the toner storage container enables easy storage and transportation, and excels in handling, the toner storage container can be detachably mounted in a process cartridge, an image forming apparatus, etc. and is used for replenishment of a toner.

As an example of the process cartridge associated with the present disclosure, the process cartridge can be detachably mounted in various image forming apparatuses, and the process cartridge includes an electrostatic latent image bearer configured to bear an electrostatic latent image, and a developing unit configured to develop the electrostatic latent image born on the electrostatic latent image bearer with the developer of the present disclosure to form a toner image. The process cartridge of the present disclosure may further include other units according to the necessity.

The developing unit includes at least a developer storage container storing the developer of the present disclosure, and a developer bearing member configured to bear the developer stored inside the developer storage container and transport the developer. The developing unit may further include a regulating member configured to regulate a thickness of the born developer.

Figure 5:
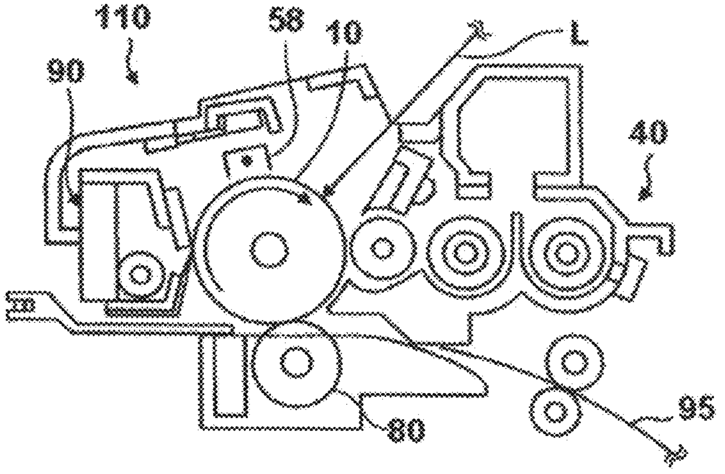
FIG. 5 is a schematic view illustrating an example of a process cartridge.

FIG. 5 illustrates an example of the process cartridge associated with the present disclosure. The process cartridge 110 includes a photoconductor drum 10, a corona discharger 58, a developing device 40, a transfer roller 80, and a cleaning device 90. In FIG. 5, the numerical reference 95 is transfer paper, and L is exposure light.

EXAMPLES

The present disclosure will be described below by way of Examples. The present disclosure should not be construed as being limited to these Examples. In Examples, "part(s)" denotes "part(s) by mass" and "%" denotes "% by mass" unless otherwise stated.

Production Example 1

<Synthesis of Amorphous Polyester (Low Molecular Polyester) Resin>

A 5 L four-necked flask equipped with a nitrogen inlet tube, a dehydration tube, a stirrer, and a thermocouple was charged with 229 parts by mass of a bisphenol A ethylene oxide (2 mol) adduct, 529 parts by mass of a bisphenol A propylene oxide (2 mol) adduct, 208 parts by mass of terephthalic acid, 46 parts by mass of adipic acid, and 2 parts by mass of dibutyl tin oxide, and the resultant mixture was allowed to react for 7 hours at 230° C. under atmospheric pressure, followed by reacting for 4 hours under the reduced pressure of from 10 mmHg through 15 mmHg. Thereafter, 44 parts by mass of trimellitic anhydride was added to the resultant, and the resultant mixture was allowed to react for 2 hours at 180° C. under atmospheric pressure, to thereby obtain [Amorphous Polyester Resin].

<Synthesis of Polyester Prepolymer>

A reaction vessel equipped with a cooling tube, a stirrer, and a nitrogen inlet tube was charged with 682 parts by mass of a bisphenol A ethylene oxide (2 mol) adduct, 81 parts by mass of a bisphenol A propylene oxide (2 mol) adduct, 283 parts by mass of terephthalic acid, 22 parts by mass of trimellitic anhydride, and 2 parts by mass of dibutyl tin oxide, and the resultant mixture was allowed to react for 8 hours at 230° C. under atmospheric pressure, followed by reacting for 5 hours at the reduced pressure of from 10 mmHg through 15 mmHg, to thereby obtain [Intermediate Polyester].

[Intermediate Polyester] had the number average molecular weight Mn of 2,100, the weight average molecular weight Mw of 9,500, the glass transition temperature Tg of 55° C., the acid value of 0.5 KOHmg/g, and the hydroxyl value of 51 KOHmg/g.

Next, a reaction vessel equipped with a cooling tube, a stirrer, and a nitrogen inlet tube was charged with 410 parts by mass of [Intermediate Polyester], 89 parts by mass of isophorone diisocyanate, 500 parts by mass of ethyl acetate, and the resultant mixture was allowed to react for 5 hours at 100° C., to thereby obtain [Prepolymer].

<Synthesis of Crystalline Polyester Resin>

A 5 L four-necked flask equipped with a nitrogen inlet tube, a dehydration tube, a stirrer, and a thermocouple was charged with 2,300 parts by mass of 1,6-hexanediol, 2,530 parts by mass of fumaric acid, 291 parts by mass of trimellitic anhydride, and 4.9 parts by mass of hydroquinone, and the resultant mixture was allowed to react for 5 hours at 160° C. Thereafter, the temperature was increased to 200° C. and the mixture was allowed to react for 1 hour, followed by reacting for 1 hour at 8.3 kPa, to thereby obtain [Crystalline Polyester Resin].

<Synthesis of Polyester Resin D-1>

A four-necked flask equipped with a nitrogen inlet tube, a dehydration tube, a stirrer, and a thermocouple was charged with a bisphenol A ethylene oxide (2 mol) adduct (Bis A-EO), a bisphenol A propylene oxide (3 mol) adduct (Bis A-PO), trimethylolpropane (TMP), terephthalic acid, and adipic acid in the manner that the molar ratio (bisphenol A ethylene oxide (2 mol) adduct/bisphenol A propylene oxide (3 mol) adduct/trimethylolpropane) between the bisphenol A ethylene oxide (2 mol) adduct, the bisphenol A propylene oxide (3 mol) adduct, and trimethylolpropane was to be 38.6/57.9/3.5, the molar ratio (terephthalic acid/adipic acid) of the terephthalic acid and the adipic acid was to be 85/15, and the molar ratio OH/COOH of hydroxyl groups to carboxyl groups was to be 1.12. The resultant mixture in combination with titanium tetraisopropoxide (500 ppm relative to the resin component) were allowed to react for 8 hours at 230° C. under atmospheric pressure, followed by reacting for 4 hours under the reduced pressure of from 10 mmHg through 15 mmHg. Thereafter, trimellitic anhydride was added to the reaction vessel in the amount of 1 mol % relative to the entire resin component, and the resultant mixture was allowed to react for 3 hours at 180° C. under atmospheric pressure, to thereby obtain [Polyester Resin D-1].

<Preparation of Master Batch (MB)-1>

Water (1,200 parts), 500 parts of carbon black (Printex35, available from Degussa) [DBP oil absorption: 42 mL/100 mg, pH: 9.5], and 500 parts of [Polyester Resin D-1] were blended, and the resultant mixture was mixed by means of HENSCHEL MIXER (available from Nippon Cole & Engineering Co., Ltd.). After kneading the mixture for 30 minutes at 150° C. using a twin-roller kneader, the resultant was rolled and cooled, followed by pulverizing to thereby obtain [Master Batch 1].

<Production of Wax Dispersion Liquid>

A vessel equipped with a stirring rod and a thermometer was charged with 50 parts of paraffin wax (HNP-9, hydrocarbon-based wax, available from Nippon Seiro Co., Ltd., melting point: 75° C., SP value: 8.8) as [Release Agent 1], and 450 parts of ethyl acetate, and the resultant mixture was heated to 80° C. with stirring. The temperature was maintained at 80° C. for 5 hours, followed by cooling to 30° C. over 1 hour. The resultant was dispersed by means of a bead mill (ULTRA VISCOMILL, available from AIMEX CO., Ltd.) under the conditions that the feeding rate was 1 kg/hr, the disc circumferential speed was 6 m/sec, zirconia beads each having a diameter of 0.5 mm were packed in the amount of 80% by volume, and the number of passes was 3, to thereby obtain [Wax Dispersion Liquid 1].

<Production of Organic Modified Layered Inorganic Mineral-1>

Montmorillonite (100 parts) was sufficiently dispersed in 200 mL of water. To the resultant dispersion liquid, 38.1 parts of dimethylstearylbenzyl ammonium chloride (423.5 g/mol), which had been sufficiently dissolved in water in advance, was added. The resultant was mixed, washed, dehydrated, and dried, to thereby produce [Organic Modified Layered Inorganic Mineral-1] having the organic ion modification rate of 100%.

<Production of Master Batch-2>

Water (2,400 parts by mass), 1,919 parts by mass of [Organic Modified Layered Inorganic Mineral-1], and 1,570 parts by mass of [Amorphous Polyester Resin A] were blended, and the resultant mixture was mixed by means of HENSCHEL MIXER (available from Nippon Cole & Engineering Co., Ltd.). After kneading the mixture for 30 minutes at 150° C. using a twin-roller kneader, the resultant was rolled and cooled, followed by pulverizing by means of a pulverizer (available from HOSOKAWA MICRON CORPORATION) to thereby obtain [Master Batch 2].

<Production of Crystalline Polyester Resin Dispersion Liquid>

A vessel equipped with a stirring rod and a thermometer was charged with 50 parts of [Crystalline Polyester Resin] and 450 parts of ethyl acetate, and the resultant mixture was heated to 80° C. with stirring. The temperature was maintained at 80° C. for 5 hours, followed by cooling to 30° C. over 1 hour. The resultant was dispersed by means of a bead mill (ULTRA VISCOMILL, available from AIMEX CO., Ltd.) under the conditions that the feeding rate was 1 kg/hr, the disc circumferential speed was 6 m/sec, zirconia beads each having a diameter of 0.5 mm were packed in the amount of 80% by volume, and the number of passes was 3, to thereby obtain [Crystalline Polyester Resin Dispersion Liquid 1].

Example 1

<Preparation of Oil Phase>

By means of TK Homomixer (available from PRIMIX Corporation), 500 parts of [Wax Dispersion Liquid 1], 750 parts of [Crystalline Polyester Resin Dispersion Liquid 1], 7,500 parts of [Amorphous Polyester Resin], 750 parts of [Master Batch 1], and 90 parts of [Master Batch 2] were mixed for 60 minutes at 5,000 rpm. Thereafter, the resultant mixture was dispersed by means of a bead mill (ULTRA VISCOMILL, available from AIMEX CO., Ltd.) under the conditions that the circumferential speed was 6 m/sec, zirconia beads each having a diameter of 0.5 mm were packed in the amount of 70% by volume, and the number of passes was 6. During the dispersing, the feeding rate was adjusted in a manner that the entire oil phase was dispersed for 0.5 minutes per pass on average.

To the resultant dispersion liquid, moreover, isophoronediamine (IPDA) in the amount with which the molar ratio ($NH_2$/NCO) of amino groups of IPDA to isocyanate groups of [Intermediate Polyester] was to be 0.98 was added. The resultant mixture was stirred by means of TK Homomixer for 15 seconds at the rotational speed of 8,000 rpm. Subsequently, 30 parts by mass of [Prepolymer] prepared as a 50% by mass ethyl acetate solution was added, and the resultant mixture was stirred by means of TK Homomixer for 30 seconds at the rotational speed of 8,000 rpm, to thereby obtain [Oil Phase 1].

<Synthesis of Organic Particle Emulsion (Particle Dispersion Liquid)>

A reaction vessel equipped with a stirring rod, and a thermometer was charged with 683 parts of water, 11 parts of sodium salt of sulfuric acid ester of methacrylic acid-ethylene oxide adduct (ELEMINOL RS-30, available from Sanyo Chemical Industries, Ltd.), 138 parts of styrene, 138 parts of methacrylic acid, and 1 part of ammonium persulfate. The resultant mixture was stirred for 15 minutes at 400 rpm, to thereby obtain a white emulsion. The obtained emulsion was heated to increase the temperature of the internal system to 75° C. and was reacted for 5 hours. To the resultant, 30 parts of a 1% ammonium persulfate aqueous solution was added, and the resultant was matured for 5 hours at 75° C., to thereby obtain an aqueous dispersion liquid of a vinyl-based resin (a copolymer of styrene, methacrylic acid, and sodium salt of sulfuric acid ester of methacrylic acid-ethylene oxide adduct) [Particle Dispersion Liquid 1]. [Particle Dispersion Liquid 1] was measured by means of LA-920 (available from HORIBA, Ltd.). As a result, the volume average particle diameter thereof was 0.14 μm. Subsequently, part of [Particle Dispersion Liquid 1] was dried to separate the resin component.

<Preparation of Aqueous Phase>

Water (990 parts), 83 parts of [Particle Dispersion Liquid 1], 37 parts of a 48.5% by mass sodium dodecyldiphenyl ether disulfonate aqueous solution (ELEMINOL MON-7, available from Sanyo Chemical Industries, Ltd.), and 90 parts of ethyl acetate were blended and stirred, to thereby obtain a milky white liquid, which was provided as [Aqueous Phase 1].

<Emulsification and Removal of Solvent>

To the vessel in which [Oil Phase 1] was accommodated, 1,200 parts of [Aqueous Phase 1] was added. The resultant mixture was mixed by means of TK Homomixer for 20 minutes at the rotational speed of 13,000 rpm, to thereby obtain [Emulsified Slurry 1].

A vessel equipped with a stirrer and a thermometer was charged with [Emulsified Slurry 1], and the solvent was removed for 8 hours at 30° C. Thereafter, the resultant was matured for 4 hours at 45° C., to thereby obtain [Dispersion Slurry 1].

<Washing and Drying>

After performing vacuum filtration of 100 parts by mass of [Dispersion Slurry 1], the following processes were performed.

(1): To the filtration cake, 100 parts of ion-exchanged water was added. The resultant mixture was mixed by means of TK Homomixer (for 10 minutes at the rotational speed of 12,000 rpm), followed by filtering the resultant mixture.

(2): To the filtration cake of (1), 100 parts by mass of a 10% sodium hydroxide aqueous solution was added. The resultant mixture was mixed by means of TK Homomixer (for 30 minutes at the rotational speed of 12,000 rpm), followed by filtering the resultant mixture under the reduced pressure.

(3): To the filtration cake of (2), 100 parts of 10% hydrochloric acid was added. The resultant mixture was mixed by means of TK Homomixer (for 10 minutes at the rotational speed of 12,000 rpm), followed by filtering the resultant mixture.

(4): To the filtration cake of (3), 300 parts by mass of ion-exchanged water was added. The resultant mixture was mixed by means of TK Homomixer (for 10 minutes at the rotational speed of 12,000 rpm), followed by filtering the resultant mixture. The process as mentioned was performed twice to obtain [Filtration Cake 1].

(5): [Filtration Cake 1] was dried by means of an air-circulating drier for 48 hours at 45° C. Then, the resultant was passed through a sieve with a mesh size of 75 micrometers, to thereby obtain [Toner 1].

<Classification>

[Toner 1] was classified by means of Elbow Jet Air Classifier with setting the cutting point to 5.8 μm, to thereby obtain [Toner 2] having the volume average particle diameter (Dv) of 6.2 μm.

<Production of Carrier>

To 100 parts by mass of toluene, 100 parts by mass of a silicone resin (organo straight silicone), 5 parts by mass of γ-(2-aminoethyl)aminopropyl trimethoxysilane, and 10 parts by mass of carbon black were added. The resultant mixture was dispersed by means of a homomixer for 20 minutes, to thereby prepare a resin layer coating liquid. The resin layer coating liquid was applied onto surfaces of spherical magnetite particles (1,000 parts by mass) having the average particle diameter of 50 μm by means of a fluidized bed coater, to thereby produce [Carrier].

<Production of Developer>

By means of a ball mill, 5 parts by mass of [Toner 1] and 95 parts by mass of [Carrier] were mixed, to thereby produce a developer.

Example 2

[Toner 3] and [Toner 4] were obtained in the same manner as in Example 1, except that the amount of [Master Batch 2] was changed to 40 parts in <Preparation of oil phase>.

Example 3

[Toner 5] and [Toner 6] were obtained in the same manner as in Example 1, except that the amount of [Master Batch 2] was changed to 75 parts in <Preparation of oil phase>.

Example 4

[Toner 7] and [Toner 8] were obtained in the same manner as in Example 1, except that the amount of [Master Batch 2] was changed to 70 parts, the circumferential speed of the bead mill was changed to 7 m/s, and the number of passes was changed to 10 passes in <Preparation of oil phase>.

Example 5

[Toner 9] and [Toner 10] were obtained in the same manner as in Example 1, except that the amount of [Master Batch 2] was changed to 40 parts, the circumferential speed of the bead mill was changed to 7 m/s, and the number of passes was changed to 10 passes in <Preparation of oil phase>.

Example 6

[Toner 11] and [Toner 12] were obtained in the same manner as in Example 1, except that the amount of [Master Batch 2] was changed to 70 parts, the circumferential speed of the bead mill was changed to 8 m/s, and the number of passes was changed to 10 passes in <Preparation of oil phase>.

Example 7

[Toner 13] and [Toner 14] were obtained in the same manner as in Example 1, except that the amount of [Master Batch 2] was changed to 40 parts, the circumferential speed of the bead mill was changed to 8 m/s, and the number of passes was changed to 10 passes in <Preparation of oil phase>.

Example 8

[Toner 15] and [Toner 16] were obtained in the same manner as in Example 1, except that the amount of [Master Batch 2] was changed to 50 parts, the circumferential speed of the bead mill was changed to 8 m/s, and the number of passes was changed to 10 passes in <Preparation of oil phase>.

Comparative Example 1

[Toner 17] and [Toner 18] were obtained in the same manner as in Example 1, except that the amount of [Master Batch 2] was changed to 30 parts in <Preparation of oil phase>.

Comparative Example 2

[Toner 19] and [Toner 20] were obtained in the same manner as in Example 1, except that the amount of [Master Batch 2] was changed to 20 parts in <Preparation of oil phase>.

Comparative Example 3

[Toner 21] and [Toner 22] were obtained in the same manner as in Example 1, except that the amount of [Master Batch 2] was changed to 95 parts in <Preparation of oil phase>.

Comparative Example 4

[Toner 23] and [Toner 24] were obtained in the same manner as in Example 1, except that the amount of [Master Batch 2] was changed to 100 parts in <Preparation of oil phase>.

Comparative Example 5

[Toner 25] and [Toner 26] were obtained in the same manner as in Example 1, except that the amount of [Master Batch 2] was changed to 40 parts, and the number of passes during the dispersing by the bead mill was changed to 1 in <Preparation of oil phase>.

Comparative Example 6

[Toner 27] and [Toner 28] were obtained in the same manner as in Example 1, except that the amount of [Master Batch 2] was changed to 70 parts, and the number of passes during the dispersing by the bead mill was changed to 1 in <Preparation of oil phase>.

Comparative Example 7

[Toner 29] and [Toner 30] were obtained in the same manner as in Example 1, except that the amount of [Master Batch 2] was changed to 70 parts, and the dispersing by the bead mill was not performed in <Preparation of Oil Phase>.

Dv of each toner above is described below.

Dv of Toner 1=5.2 μm

Dv of Toner 2=6.2 μm

Dv of Toner 3=5.7 μm

Dv of Toner 4=6.8 μm

Dv of Toner 5=5.3 μm

Dv of Toner 6=6.4 μm

Dv of Toner 7=5.7 μm

Dv of Toner 8=6.8 μm

Dv of Toner 9=5.3 μm

Dv of Toner 10=6.4 μm

Dv of Toner 11=5.5 μm
Dv of Toner 12=6.6 μm
Dv of Toner 13=5.2 μm
Dv of Toner 14=6.2 μm
Dv of Toner 15=5.6 μm
Dv of Toner 16=6.7 μm
Dv of Toner 17=5.4 μm
Dv of Toner 18=6.5 μm
Dv of Toner 19=5.4 μm
Dv of Toner 20=6.5 μm
Dv of Toner 21=5.4 μm
Dv of Toner 22=6.5 μm
Dv of Toner 23=5.8 μm
Dv of Toner 24=7.0 μm
Dv of Toner 25=5.3 μm
Dv of Toner 26=6.4 μm
Dv of Toner 27=5.5 μm
Dv of Toner 28=6.6 μm
Dv of Toner 29=5.4 μm
Dv of Toner 30=6.5 μm

EVALUATIONS

<Cleaning Performance>

After performing evaluation of toner scattering as described below, the degree of the toner passed through after cleaning of a digital full-color printer was determined by confirming a deposition amount of toner stains on the image bearer with naked eyes after the cleaning, to thereby evaluate cleaning performance. The evaluation criteria is as described below. The results of "I" and "II" were determined as acceptable, and the results of "III" were determined as unacceptable.

[Evaluation Criteria]

I: There was no problem.

II: There was a slight problem (stains were slightly observed on the image bearer).

III: There was a problem.

<Low-Temperature Fixability>

A copying test was performed on Type 6200 paper (available from Ricoh Company Limited) by means of a modified device of imageo MP C5002 (available from Ricoh Company Limited), in which the fixing unit thereof had been modified. Specifically, a cold offset temperature (the minimum fixing temperature) was determined with varying a fixing temperature. As evaluation conditions of the minimum fixing temperature, the linear speed of paper feeding was set to 200 mm/sec, the surface pressure was set to 1.0 kgf/cm$^2$, and the nip width was set to 7 mm. Moreover, the results were evaluated with 4 ranks based on the following criteria. The results of "A," "B," and "C" were determined as acceptable, and the results of "D" were determined as unacceptable.

[Evaluation Criteria of Minimum Fixing Temperature]

A: lower than 120° C.

B: 120° C. or higher but lower than 125° C.

C: 125° C. or higher but lower than 130° C.

D: 130° C. or higher

<Evaluation of Toner Scattering>

A chart having the imaging rate of 20% was continuously printed on 80,000 sheets by means of a commercially available digital full-color printer (imagioMPC6000, A4-landscape color 50 sheets/min, available from Ricoh Company Limited). Thereafter, the degree of the toner contamination inside the printer was visually observed, and was evaluated with 4 ranks based on the following criteria. The results of "I" and "II" were determined as acceptable, and the results of "III" were determined as unacceptable.

[Evaluation Criteria]

I: No toner contamination was observed at all.

II: Slight toner contamination was observed.

III: Toner contamination was observed.

<Toner Evaluation>

The toner of each of Examples and Comparative Examples was measured by X-ray fluorescence spectroscopy (XRF) to determine an atomic concentration % of Al.

Moreover, the toner of each of Examples and Comparative Examples was measured by X-ray photoelectron spectroscopy (XPS) to determine an atomic concentration % of Al. The atomic concentration % of Al as measured by XPS was determined as M1, and the atomic concentration % of Al as measured by XRF was determined as M2.

When the volume average particle diameter of the toner was determined as Dv, moreover, the particles obtained by classifying the toner to 6/5 Dv were measured by XPS and XRF to determine an atomic concentration % of Al. The atomic concentration % of Al in the particles as measured by XPS was determined as M3, and the atomic concentration % of Al in the particles as measured by XRF was determined as M4. Then, a ratio (M1/M2)/(M3/M4) was determined.

The measuring methods were as described above.

The results are presented in Table 1.

TABLE 1

| | | M1 | M2 | M3 | M4 | M1/M2 | (M1/M2)/(M3/M4) |
|---|---|---|---|---|---|---|---|
| Ex. 1 | Toner 1 | 0.90 | 0.84 | NA | NA | 1.07 | 0.87 |
| | Toner 2 | NA | NA | 1.00 | 0.81 | NA | NA |
| Ex. 2 | Toner 3 | 0.56 | 0.36 | NA | NA | 1.56 | 1.20 |
| | Toner 4 | NA | NA | 0.52 | 0.40 | NA | NA |
| Ex. 3 | Toner 5 | 1.02 | 0.79 | NA | NA | 1.29 | 1.12 |
| | Toner 6 | NA | NA | 0.91 | 0.79 | NA | NA |
| Ex. 4 | Toner 7 | 0.92 | 0.70 | NA | NA | 1.31 | 0.85 |
| | Toner 8 | NA | NA | 1.05 | 0.68 | NA | NA |
| Ex. 5 | Toner 9 | 0.76 | 0.40 | NA | NA | 1.90 | 1.13 |
| | Toner 10 | NA | NA | 0.69 | 0.41 | NA | NA |
| Ex. 6 | Toner 11 | 1.18 | 0.70 | NA | NA | 1.7 | 1.05 |
| | Toner 12 | NA | NA | 1.14 | 0.71 | NA | NA |
| Ex. 7 | Toner 13 | 0.82 | 0.40 | NA | NA | 2.05 | 1.01 |
| | Toner 14 | NA | NA | 0.81 | 0.40 | NA | NA |
| Ex. 8 | Toner 15 | 0.84 | 0.55 | NA | NA | 1.53 | 1.07 |
| | Toner 16 | NA | NA | 0.79 | 0.55 | NA | NA |
| Comp. Ex. 1 | Toner 17 | 0.40 | 0.33 | NA | NA | 1.20 | 0.97 |
| | Toner 18 | NA | NA | 0.41 | 0.33 | NA | NA |
| Comp. Ex. 2 | Toner 19 | 0.29 | 0.28 | NA | NA | 1.05 | 0.94 |
| | Toner 20 | NA | NA | 0.30 | 0.27 | NA | NA |
| Comp. Ex. 3 | Toner 21 | 1.70 | 0.93 | NA | NA | 1.83 | 1.13 |
| | Toner 22 | NA | NA | 1.50 | 0.92 | NA | NA |
| Comp. Ex. 4 | Toner 23 | 1.95 | 1.10 | NA | NA | 1.77 | 1.13 |
| | Toner 24 | NA | NA | 1.67 | 1.06 | NA | NA |
| Comp. Ex. 5 | Toner 25 | 0.50 | 0.37 | NA | NA | 1.36 | 1.21 |
| | Toner 26 | NA | NA | 0.45 | 0.40 | NA | NA |
| Comp. Ex. 6 | Toner 27 | 1.12 | 0.79 | NA | NA | 1.42 | 1.24 |
| | Toner 28 | NA | NA | 0.90 | 0.79 | NA | NA |
| Comp. Ex. 7 | Toner 29 | 1.12 | 0.77 | NA | NA | 1.45 | 0.79 |
| | Toner 30 | NA | NA | 1.20 | 0.65 | NA | NA |

| | | Toner scattering | Cleaning performance | Low-temperature fixability |
|---|---|---|---|---|
| Ex. 1 | Toner 1 | II | I | C |
| | Toner 2 | NA | NA | NA |
| Ex. 2 | Toner 3 | II | II | A |
| | Toner 4 | NA | NA | NA |
| Ex. 3 | Toner 5 | II | II | C |
| | Toner 6 | NA | NA | NA |
| Ex. 4 | Toner 7 | I | II | C |
| | Toner 8 | NA | NA | NA |

TABLE 1-continued

| | | | | |
|---|---|---|---|---|
| Ex. 5 | Toner 9 | II | II | A |
| | Toner 10 | NA | NA | NA |
| Ex. 6 | Toner 11 | IT | I | C |
| | Toner 12 | NA | NA | NA |
| Ex. 7 | Toner 13 | I | I | A |
| | Toner 14 | NA | NA | NA |
| Ex. 8 | Toner 15 | I | I | B |
| | Toner 16 | NA | NA | NA |
| Comp. | Toner 17 | I | III | D |
| Ex. 1 | Toner 18 | NA | NA | NA |
| Comp. | Toner 19 | III | III | B |
| Ex. 2 | Toner 20 | NA | NA | NA |
| Comp. | Toner 21 | II | I | D |
| Ex. 3 | Toner 22 | NA | NA | NA |
| Comp. | Toner 23 | III | II | B |
| Ex. 4 | Toner 24 | NA | NA | NA |
| Comp. | Toner 25 | III | II | B |
| Ex. 5 | Toner 26 | NA | NA | NA |
| Comp. | Toner 27 | III | II | B |
| Ex. 6 | Toner 28 | NA | NA | NA |
| Comp. | Toner 29 | III | II | B |
| Ex. 7 | Toner 30 | NA | NA | NA |

What is claimed is:

1. A toner, comprising:

toner base particles, each including a binder resin, a colorant, and inorganic filler, wherein an atomic concentration % of Al in the toner base particles as measured by X-ray fluorescence spectroscopy (XRF) is 0.35 or greater but 0.85 or less, and wherein the toner satisfies 0.8<(M1/M2)/(M3/M4)<1.2 where M1 is an atomic concentration % of Al in the toner base particles as measured by X-ray photoelectron spectroscopy (XPS), M2 is the atomic concentration % of Al in the toner base particles as measured by XRF, and M3 is an atomic concentration % of Al in particles as measured by XPS, and M4 is an atomic concentration % of Al in the particles as measured by XRF, where the particles are particles obtained by classifying the toner base particles into 6/5Dv, and Dv is a volume average particle diameter of the toner base particles; and wherein the binder resin comprises a crystalline polyester resin and an amount of the crystalline polyester resin is from 3 parts by mass through 20 parts by mass relative to 100 parts by mass of the toner.

2. The toner according to claim 1, wherein the atomic concentration % of Al in the toner base particles as measured by X-ray fluorescence spectroscopy (XRF) is 0.4 or greater but 0.8 or less.

3. The toner according to claim 1, wherein the atomic concentration % of Al in the toner base particles as measured by X-ray fluorescence spectroscopy (XRF) is 0.4 or greater but 0.6 or less.

4. The toner according to claim 1, wherein the ratio (M1/M2)/(M3/M4) satisfies 0.9< (M1/M2)/(M3/M4)<1.1.

5. The toner according to claim 1, wherein the (M1/M2) is greater than 1.4.

6. The toner according to claim 1, wherein the atomic concentration % of Al in the toner base particles as measured by X-ray fluorescence spectroscopy (XRF) is 0.4 or greater but 0.8 or less, and wherein the ratio (M1/M2)/(M3/M4) satisfies 0.9< (M1/M2)/(M3/M4)<1.1.

7. The toner according to claim 1, wherein the atomic concentration % of Al in the toner base particles as measured by X-ray fluorescence spectroscopy (XRF) is 0.4 or greater but 0.6 or less, and wherein the ratio (M1/M2)/(M3/M4) satisfies 0.9< (M1/M2)/(M3/M4)<1.1.

8. The toner according to claim 1, wherein the atomic concentration % of Al in the toner base particles as measured by X-ray fluorescence spectroscopy (XRF) is 0.4 or greater but 0.8 or less, and wherein the (M1/M2) is greater than 1.4.

9. A developer comprising:

the toner according to claim 1; and a carrier.

10. An image forming method, comprising:

forming an electrostatic latent image on an electrostatic latent image bearer; and developing the electrostatic latent image formed on the electrostatic latent image bearer with a toner to form a visible image, wherein the toner is the toner according to claim 1.

11. The image forming method according to claim 10, wherein the atomic concentration % of Al in the toner base particles as measured by X-ray fluorescence spectroscopy (XRF) is 0.4 or greater but 0.8 or less.

12. The image forming method according to claim 10, wherein the atomic concentration % of Al in the toner base particles as measured by X-ray fluorescence spectroscopy (XRF) is 0.4 or greater but 0.6 or less.

13. The image forming method according to claim 10, wherein the ratio (M1/M2)/(M3/M4) satisfies 0.9< (M1/M2)/(M3/M4)<1.1.

14. The image forming method according to claim 10, wherein the (M1/M2) is greater than 1.4.

15. The toner according to claim 1, wherein the binder resin comprises the crystalline polyester and an amorphous polyester.

16. The toner according to claim 15, wherein an amount of the inorganic filler is from 0.3 parts by mass through 1.5 parts by mass relative to 100 parts by mass of the toner.

17. The toner according to claim 16, wherein the inorganic filler is a layered inorganic material.

18. The toner according to claim 17, wherein the layered inorganic material comprises ions present between layers of the layered inorganic mineral that are modified with an organic ion.

19. The toner according to claim 18, wherein the layered inorganic material comprises organic modified montmorillonite.

* * * * *